United States Patent
Conklin

(10) Patent No.: US 7,606,312 B2
(45) Date of Patent: Oct. 20, 2009

(54) INTRA CODING VIDEO DATA METHODS AND APPARATUSES

(75) Inventor: Gregory J. Conklin, Seattle, WA (US)

(73) Assignee: RealNetworks, Inc., Seattle, WA (US)

(*) Notice: Subject to any disclaimer, the term of this patent is extended or adjusted under 35 U.S.C. 154(b) by 1062 days.

(21) Appl. No.: 10/525,164

(22) PCT Filed: Jun. 12, 2003

(86) PCT No.: PCT/US03/18963

§ 371 (c)(1),
(2), (4) Date: Feb. 22, 2005

(87) PCT Pub. No.: WO2004/006587

PCT Pub. Date: Jan. 15, 2004

(65) Prior Publication Data

US 2006/0056518 A1  Mar. 16, 2006

Related U.S. Application Data

(63) Continuation-in-part of application No. 09/732,522, filed on Dec. 6, 2000, now Pat. No. 6,765,964.

(60) Provisional application No. 60/394,524, filed on Jul. 8, 2002, provisional application No. 60/414,120, filed on Sep. 27, 2002, provisional application No. 60/415,447, filed on Oct. 1, 2002.

(51) Int. Cl.
*H04N 7/12* (2006.01)
*H04N 11/02* (2006.01)
*H04N 11/04* (2006.01)

(52) U.S. Cl. .............. 375/240.24; 375/240.25; 375/240.13

(58) Field of Classification Search .......... 375/240.01–240.07, 240.12–240.16, 240.24–240.26
See application file for complete search history.

(56) References Cited

U.S. PATENT DOCUMENTS

| | | | | |
|---|---|---|---|---|
| 4,951,139 A | * | 8/1990 | Hamilton et al. | 375/240.07 |
| 5,247,355 A | * | 9/1993 | Frederiksen | 375/240.12 |
| 5,946,044 A | * | 8/1999 | Kondo et al. | 348/458 |
| 6,031,937 A | * | 2/2000 | Graffagnino | 382/236 |
| 6,256,346 B1 | * | 7/2001 | Yamaguchi et al. | 375/240.12 |

OTHER PUBLICATIONS

Bjontegaard G. (Editor): "H.26L Test Model Long Term Number 8 (TML-8) Drafto" ITU Study Group 16 - Video Coding Experts Group, XX, XX, Apr. 2, 2001, pp. 1-2, 16-19, XP002250455.
"Working Draft Number 2, Revision 0 (WD-2)" Document JVT-B118, XX, XX, Dec. 3, 2001, pp. 1, 3-100, XP001086632.

* cited by examiner

*Primary Examiner*—David Czekaj
(74) *Attorney, Agent, or Firm*—Adam L. K. Philipp; AXIOS Law

(57) ABSTRACT

Streamlined prediction approaches are provided to predict pixel values of a 4×4 subblock of a macroblock of video data being encoded, under a number of prediction modes. Additionally, prediction approaches are provided to predict pixel values of a non-4×4 M×N subblock of a macroblock of video data being encoded, under a number of prediction modes, including 8×8, 8×4 and 4×8 subblocks. The invention may be practiced in an encoder and/or a decoder of a video apparatus.

14 Claims, 8 Drawing Sheets

| q | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |
|---|---|---|---|---|---|---|---|---|---|---|---|---|---|---|---|---|
| $l_0$ | $p_{00}$ | $p_{01}$ | $p_{02}$ | $p_{03}$ | $p_{04}$ | $p_{05}$ | $p_{06}$ | $p_{07}$ | | | | | | | | |
| $l_1$ | $p_{10}$ | $p_{11}$ | $p_{12}$ | $p_{13}$ | $p_{14}$ | $p_{15}$ | $p_{16}$ | $p_{17}$ | | | | | | | | |
| $l_2$ | $p_{20}$ | $p_{21}$ | $p_{22}$ | $p_{23}$ | $p_{24}$ | $p_{25}$ | $p_{26}$ | $p_{27}$ | | | | | | | | |
| $l_3$ | $p_{30}$ | $p_{31}$ | $p_{32}$ | $p_{33}$ | $p_{34}$ | $p_{35}$ | $p_{36}$ | $p_{37}$ | | | | | | | | |
| $l_4$ | $p_{40}$ | $p_{41}$ | $p_{42}$ | $p_{43}$ | $p_{44}$ | $p_{45}$ | $p_{46}$ | $p_{47}$ | | | | | | | | |
| $l_5$ | $p_{50}$ | $p_{51}$ | $p_{52}$ | $p_{53}$ | $p_{54}$ | $p_{55}$ | $p_{56}$ | $p_{57}$ | | | | | | | | |
| $l_6$ | $p_{60}$ | $p_{61}$ | $p_{62}$ | $p_{63}$ | $p_{64}$ | $p_{65}$ | $p_{66}$ | $p_{67}$ | | | | | | | | |
| $l_7$ | $p_{70}$ | $p_{71}$ | $p_{72}$ | $p_{73}$ | $p_{74}$ | $p_{75}$ | $p_{76}$ | $p_{77}$ | | | | | | | | |

Figure 9a

| q | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ | $t_{13}$ | $t_{14}$ | $t_{15}$ |
|---|---|---|---|---|---|---|---|---|---|---|---|---|---|---|---|---|
| $l_0$ | $p_{00}$ | $p_{01}$ | $p_{02}$ | $p_{03}$ | $p_{04}$ | $p_{05}$ | $p_{06}$ | $p_{07}$ | | | | | | | | |
| $l_1$ | $p_{10}$ | $p_{11}$ | $p_{12}$ | $p_{13}$ | $p_{14}$ | $p_{15}$ | $p_{16}$ | $p_{17}$ | | | | | | | | |
| $l_2$ | $p_{20}$ | $p_{21}$ | $p_{22}$ | $p_{23}$ | $p_{24}$ | $p_{25}$ | $p_{26}$ | $p_{27}$ | | | | | | | | |
| $l_3$ | $p_{30}$ | $p_{31}$ | $p_{32}$ | $p_{33}$ | $p_{34}$ | $p_{35}$ | $p_{36}$ | $p_{37}$ | | | | | | | | |

Figure 9b

| q | $t_0$ | $t_1$ | $t_2$ | $t_3$ | $t_4$ | $t_5$ | $t_6$ | $t_7$ |
|---|---|---|---|---|---|---|---|---|
| $l_0$ | $p_{00}$ | $p_{01}$ | $p_{02}$ | $p_{03}$ | | | | |
| $l_1$ | $p_{10}$ | $p_{11}$ | $p_{12}$ | $p_{13}$ | | | | |
| $l_2$ | $p_{20}$ | $p_{21}$ | $p_{22}$ | $p_{23}$ | | | | |
| $l_3$ | $p_{30}$ | $p_{31}$ | $p_{32}$ | $p_{33}$ | | | | |
| $l_4$ | $p_{40}$ | $p_{41}$ | $p_{42}$ | $p_{43}$ | | | | |
| $l_5$ | $p_{50}$ | $p_{51}$ | $p_{52}$ | $p_{53}$ | | | | |
| $l_6$ | $p_{60}$ | $p_{61}$ | $p_{62}$ | $p_{63}$ | | | | |
| $l_7$ | $p_{70}$ | $p_{71}$ | $p_{72}$ | $p_{73}$ | | | | |

Figure 9c

INTRA CODING VIDEO DATA METHODS AND APPARATUSES

RELATED APPLICATION

This application is a continuation-in-part application of U.S. application Ser. No., 09/732,522, filed Dec. 6, 2000, now U.S. Pat. No. 6,765,964 entitled "System and Method for Intracoding Video Data".

This application also claims priority to Provisional Applications:

No. 60/394,524, filed Jul. 8, 2002, entitled "Low Complexity Diagonal Mode for Intra-Prediction";

number 60/414,120, filed Sep. 27, 2002, entitled "Reducing Pixel Dependencies for Intra Prediction";

No. 60/415,447, filed Oct. 1, 2002, entitled "Reducing Pixel Dependencies for Intra Prediction With Varying Block Sizes". The specifications of these applications are hereby fully incorporated by reference.

BACKGROUND OF THE INVENTION

1. Field of the Invention

The invention pertains to a video system that compresses video data for transmission or storage and decompresses the video data for display. More particularly, the invention pertains to a video system and a method for intracoding video data.

2. Description of the Related Art

Video systems transmit, process and store large quantities of video data. To create a video presentation, such as a video movie, a rendering video system displays the video data as a plurality of digital images, also referred to as "frames," thereby simulating movement. In order to achieve a video presentation with an acceptable video quality, or to enable transmission and storage at all, a conventional video system modifies the video data prior to transmission or storage. For instance, the video system compresses and encodes the video data to reduce the bit rate for storage and transmission.

In a conventional video system a video encoder is used to compress and encode the video data and a video decoder is used to decompress and to decode the video data. The video encoder outputs video data that has a reduced bit rate and a reduced redundancy. That is, the technique of video compression removes spatial redundancy within a video frame or temporal redundancy between consecutive video frames.

The video encoder and video decoder may be configured to apply one of two types of coding to compress the video stream, namely intracoding and intercoding. These two types of coding are based on the statistical properties of the video frames. When the video frames are coded using intracoding, the compression is based on information contained in a single frame (the frame that is compressed) by using the spatial redundancy within the frame. Intracoding, thus, does not depend on any other frames. In contrast, intercoding uses at least one other frame as a reference and codes a difference between the frame to be compressed and the reference frame. Intercoding is thus based on a temporal redundancy between consecutive frames in the video data.

The field of video compression is subject to international standards, e.g., various International Telecommunications Union (ITU) standards that define uniform requirements for video coding and decoding. Typically, these standards evolve based on contributions from the industry. In addition, manufacturers of video coders and decoders also modify or build upon the international standards and implement additional proprietary techniques for video compression.

Despite the existence of the international standards and the proprietary techniques, there is still a need for improved techniques for video compression. For example, as the quality of a displayed video movie depends directly from the technique used for video compression, any improvement of the video compression technique makes the video movie more pleasing for the viewer.

BRIEF DESCRIPTION OF THE DRAWINGS

These and other aspects, advantages, and novel features of the invention will become apparent upon reading the following detailed description and upon reference to the accompanying drawings.

FIGS. 9a-9c illustrate the surrounding pixels used for predicting the pixel values of a 8×8, a 8×4 and a 4×8 subblock respectively, in accordance to three alternate embodiments.

DETAILED DESCRIPTION OF THE PREFERRED EMBODIMENT

In the following description, reference is made to the accompanying drawings, which form a part hereof, and which show, by way of illustration, specific embodiments in which the invention may be practiced. It is to be understood that other embodiments may be utilized and structural changes may be made without departing from the scope of the present invention. Where possible, the same reference numbers will be used throughout the drawings to refer to the same or like components. Numerous specific details are set forth in order to provide a thorough understanding of the present invention. However, it will be obvious to one skilled in the art that the present invention may be practiced without the specific details or with certain alternative equivalent devices and methods to those described herein. In other instances, well-known methods, procedures, components, and devices have not been described in detail so as not to unnecessarily obscure aspects of the present invention.

Various operations will be described as multiple discrete steps in turn, in a manner that is helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
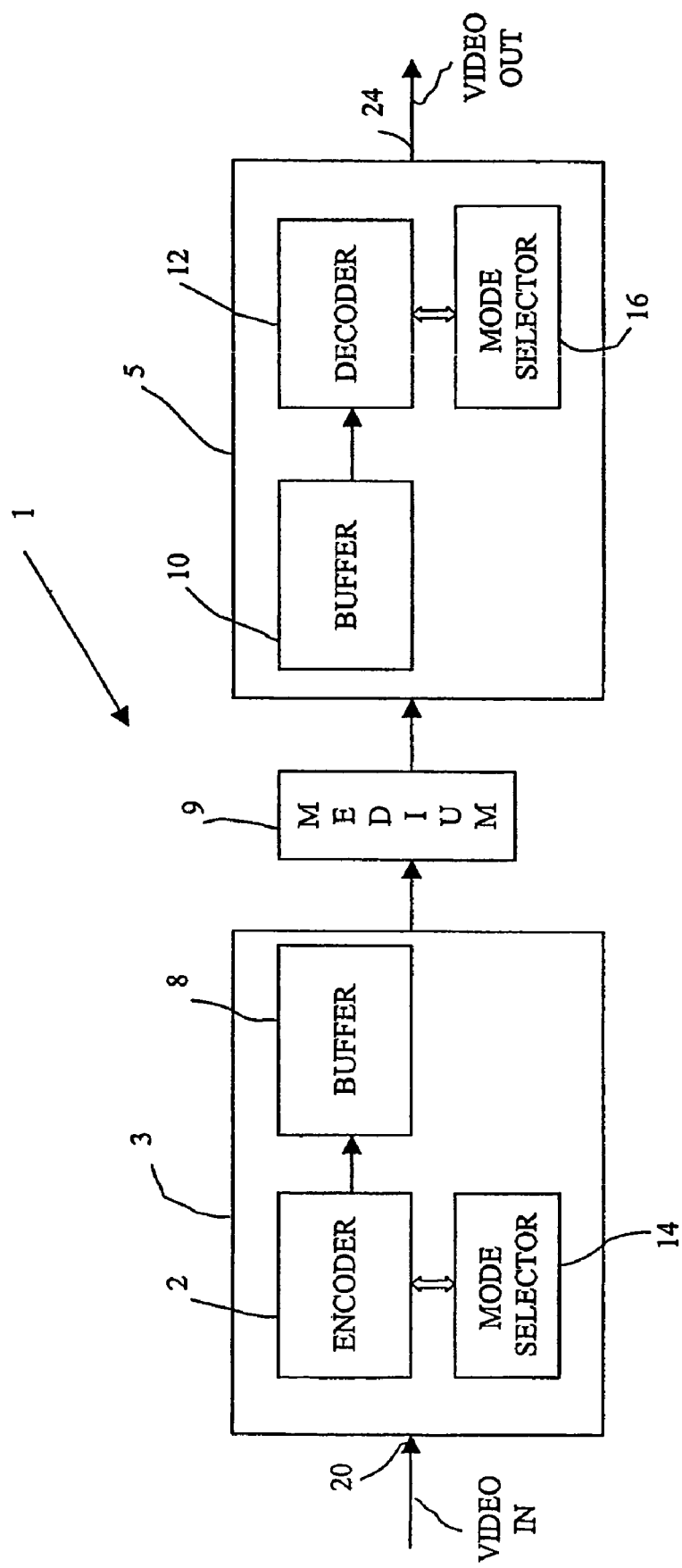
FIG. 1 is a high-level block diagram of a system for video applications having an encoding side and a decoding side.

FIG. 1 is a high-level block diagram of a video compression and decompression system 1 (hereinafter "video system 1") having an encoder apparatus 3 and a decoder apparatus 5 that is coupled to the encoder apparatus 3 through a medium 9. The encoder apparatus 3 includes a video encoder 2, a mode selector 14 and a buffer 8. The decoder apparatus 5 includes a buffer 10, a video decoder 12 and a mode selector 16. The encoder apparatus 3 receives a video sequence 20 (VIDEO IN) and encodes the video sequence 20 to generate an encoded and thus compressed representation in one of a number of possible formats. The format may be in an interleaved format tailored for "live" streaming of the encoded representation. The format may also be in a single file format in which each of the encoded representation is stored in a contiguous block within one file.

The video sequence 20 input to the encoder apparatus 3 may be either a live signal, e.g., provided by a video camera, or a prerecorded sequence in a predetermined format. The video sequence 20 includes frames of a digital video, an audio segment consisting of digital audio, combinations of video, graphics, text, and/or audio (multimedia applications), or analog forms of the aforementioned. If necessary, conversions can be applied to various types of input signals such as analog video, or previously compressed and encoded video to produce an appropriate input to the encoder apparatus 3. In one embodiment, the encoder apparatus 3 may accept video in RGB or YUV formats. The encoder apparatus 3, however, may be adapted to accept any format of input as long as an appropriate conversion mechanism is supplied. Conversion mechanisms for converting a signal in one format to a signal in another format are well known in the art.

The medium 9 may be a storage device or a transmission medium. In one embodiment, the video system 1 may be implemented on a computer. The encoder apparatus 3 sends an encoded video stream (representation) to the medium 9 that is implemented as a storage device. The storage device may be a video server, a hard disk drive, a CD rewriteable drive, a read/write DVD drive, or any other device capable of storing and allowing the retrieval of encoded video data. The storage device is connected to the decoder apparatus 5, which can selectively read from the storage device and decode the encoded video sequence. As the decoder apparatus 5 decodes a selected one of the encoded video sequence, it generates a reproduction of the video sequence 20, for example, for display on a computer monitor or screen.

In another embodiment, the medium 9 provides a connection to another computer, which may be a remote computer that receives the encoded video sequence. The medium 9 may be a network connection such as a LAN, a WAN, the Internet, or the like. The decoder apparatus 5 within the remote computer decodes the encoded representations contained therein and may generate a reproduction of the video sequence 20 on a screen or a monitor of the remote computer.

Aspects of the video system 1 illustrated in FIG. 1 and described above can be combined and supplemented to achieve other embodiments. Numerous other implementations are consistent with the scope of this invention. Such other implementations need not be restricted to video, but may include audio or other forms of media as well.

Pre-existing video encoding techniques typically break up a frame (picture) into smaller blocks of pixels called macroblocks. Each macroblock can consist of a matrix of pixels, typically a 16×16 matrix, defining the unit of information at which encoding is performed. The matrix of pixels is therefore referred to as a 16×16 macroblock. These video encoding techniques usually break each 16×16 macroblock further up into smaller matrices of pixels, e.g. 8×8 matrices of pixels or 4×4 matrices of pixels. Such matrices are hereinafter referred to as subblocks.

In one embodiment of the present invention, a 16×16 macroblock is divided into 16 4×4 subblocks. In other embodiments, a 16×16 marcoblock is divided into 8×8 subblocks, 8×4 subblocks, or 4×8 subblocks. Those skilled in the art will appreciate that the present invention is equally applicable or easily adaptable to systems that use other sublocks, or only 16×16 marcoblocks without breaking it up into subblocks.

Further, the pre-existing encoding techniques provide for motion compensation and motion estimation using motion vectors. The motion vectors describe the direction, expressed through an x-component and a y-component, and the amount of motion of the 16×16 macroblocks, or their respective subblocks, and are transmitted to the decoder as part of the bit stream. Motion vectors are used for bidirectionally encoded pictures (B-pictures) and predicted pictures (P pictures) as known in the art.

The video encoder 2 performs a discrete cosine transform (DCT) to encode and compress the video sequence 20. Briefly, the video encoder 2 converts the video sequence 20 from the spacial, temporal domain into the frequency domain. The output of the video encoder 2 is a set of signal amplitudes, called "DCT coefficients." A quantizer receives the DCT coefficients and assigns each of a range (or step size) of DCT coefficient values a single value, such as a small integer, during encoding. Quantization allows data to be represented more compactly, but results in the loss of some data. Quantization on a finer scale results in a less compact representation (higher bit-rate), but also involves the loss of less data. Quantization on a more coarse scale results in a more compact representation (lower bit-rate), but also involves more loss of data. The mode selector 14 communicates with the video encoder 2 and monitors and controls encoding of the video sequence 20. The mode selector 14 determines in accordance with the present invention prediction modes according to which the video encoder 2 encodes the video sequence 20. The mode selector 14 may be a processor or one or more software modules that are configured to operate in accordance with a method of the present invention. FIG. 1 shows the mode selector 14 for illustrative purposes as an element separate from the video encoder 2. Those skilled in the art will appreciate that the functionality of the mode selector 14 may be combined with the functionality of the video encoder 2.

The buffer 8 of the encoder apparatus 3 receives the encoded and compressed video sequence (hereinafter "encoded video sequence") from the video encoder 2 and adjusts the bit rate of the encoded video sequence before it is sent to the medium 9. Buffering may be required because individual video images may contain varying amounts of information, resulting in varying coding efficiencies from image to image. As the buffer 8 has a limited size, a feedback loop to the quantizer may be used to avoid overflow or underflow of the buffer 8. The bit-rate of the representation is the rate at which the representation data must be processed in order to present the representation in real time.

The decoder apparatus 5 performs the inverse function of the encoder apparatus 3. The buffer 10 serves also to adjust the bit rate of the incoming encoded video sequence. The video decoder 12 decodes and decompresses in combination with the mode selector 16 the incoming video sequence reconstructing the video sequence. The mode selector 16 determines the prediction modes according to which the video encoder 2 encoded the incoming video sequence. The decoder apparatus 5 outputs a decoded and decompressed video sequence 24 illustrated as "VIDEO OUT" (hereinafter "decoded video sequence 24").

The video decoder 12 receives a bit stream that represents the encoded video sequence from the buffer 10 (FIG. 1). In one embodiment, the video decoder is a conventional video decoder, e.g., a MPEG-x decoder, that includes a decoder controller, a VLC decoder (Variable Length Coding, VLC) and a reconstruction module. The operation and function of these components are known to those skilled in the art. These components are known to those skilled in the art and described in generally available MPEG documents and publications.

Figure 2:
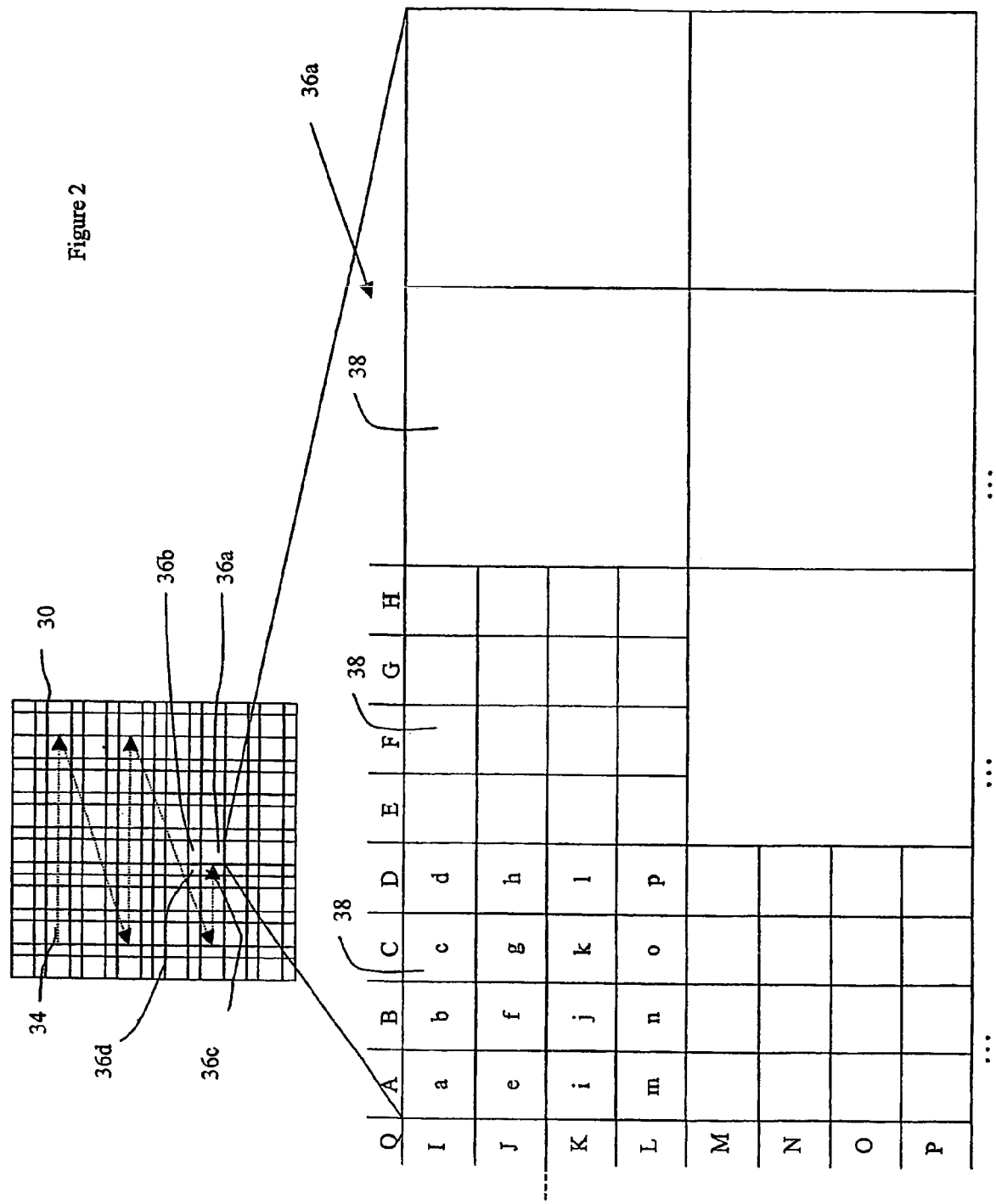
FIG. 2 is a high-level illustration of a frame and its division in macroblocks and subblocks.

FIG. 2 is a diagram illustrating a video frame 30 that is part of the video sequence 20. As described above, known video encoding techniques typically break up a video frame 30 into macroblocks 36, 36a, 36b, 36c, 36d. For example, the video frame 30 is divided into a matrix of 16×16 macroblocks 36, 36a, 36b, 36c, 36d. The video system 1 encodes the macroblocks 36, 36a, 36b, 36c, 36d line by line, from top to bottom and from left to right, as indicated through a dashed line 34 that illustrates the sequence of, e.g., intra encoding. In the illustrated embodiment, the dashed line 34 ends at the macroblock 36a, which is the next macroblock to be encoded. All prior macroblocks 36, 36b, 36c, 36d have already been encoded.

The macroblock 36a, as a representative for all macroblocks 36, 36a, 36b, 36c, 36d, is shown in greater detail below the video frame 30. The video encoding technique of the video system 1 breaks each macroblock 36, 36a, 36b, 36c, 36d further up into a matrix of pixels 38, hereinafter referred to as a subblock 38.

In one embodiment, the subblock 38 is a 4×4 matrix of pixels, wherein the 16 pixels are labeled as a, b, c, . . . , p (in a "row first" manner). Bordering pixels of an adjacent subblock of a neighboring macroblock 36b, which is located directly above subblock 38 of macroblock 36a, are labeled as A, B, C, D. Further, bordering pixels of a subblock of macroblock 36b located above and to the right of the subblock 38 are labeled as E, F, G, H. Likewise, bordering pixels of an adjacent subblock of a neighboring macroblock 36c, which is located directly to the left of subblock 38 of macroblock 36a, are labeled as I, J, K, L. Bordering pixels of a subblock of marcoblock 36c located to the left and below of subblock 38 are labeled as M, N, O, P. A bordering pixel of a subblock of a macroblock 36d, which is located above and to the left of subblock 38 of the macroblock 36a, is labeled as Q.

The video system 1 of the present invention codes each macroblock 36 as an intra macroblock. Intra macroblocks are transform encoded without motion compensated prediction. Thus, intra macroblocks do not reference decoded data from either previous or subsequent frames. An I-frame is a frame consisting completely of intra macroblocks. Thus, I-frames are encoded with no reference to previous or subsequent frames. I-frames are also known as "Intra-frames."

Figure 3:
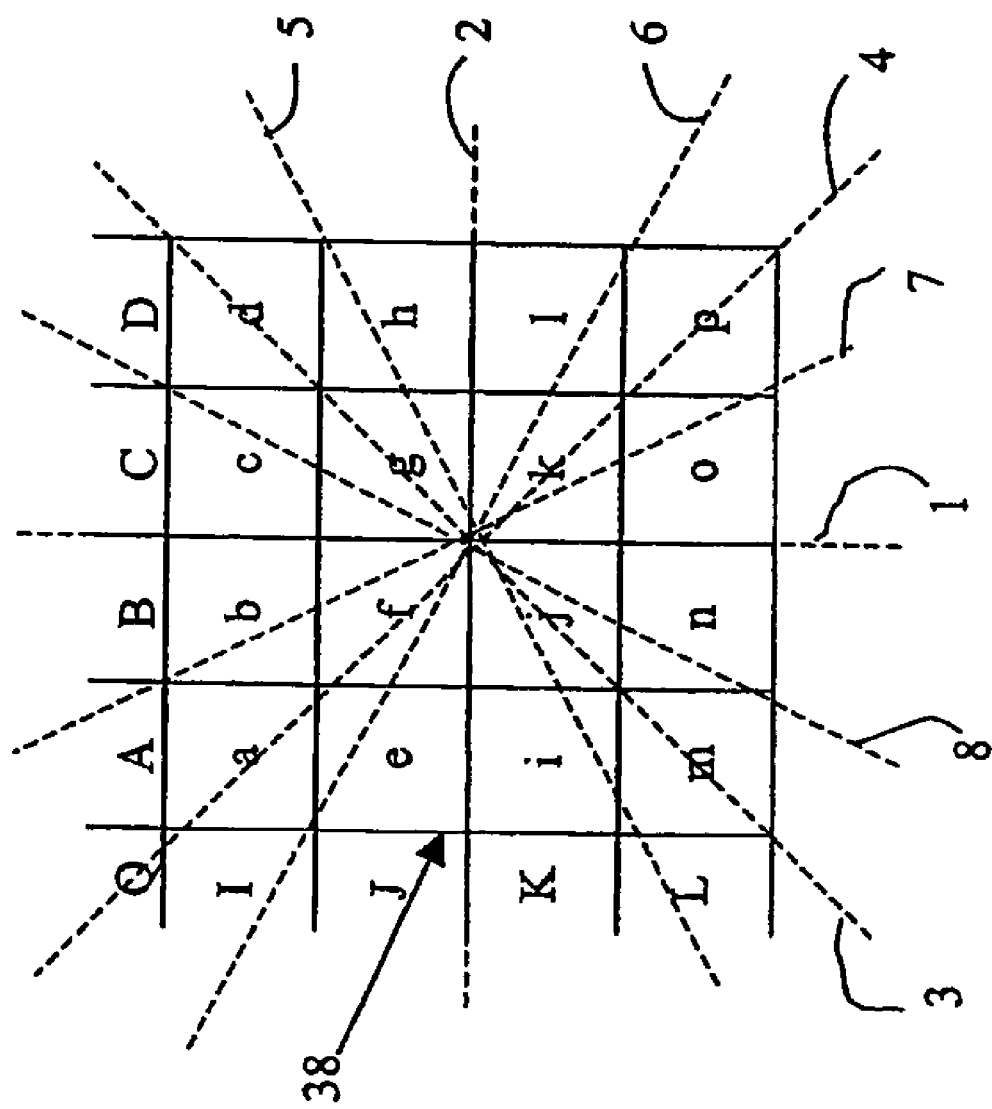
FIG. 3 is a subblock illustrating the directions according to which the subblock can be encoded, wherein each direction represents one of eight prediction modes in accordance with the present invention.

FIG. 3 is a subblock 38 illustrating possible directions according to which the subblock 38 may be encoded. In accordance with the present invention, the subblocks of a macroblock 36, 36a, 36b, 36c, 36d can be intra coded in one of nine modes (Modes 0, Mode 1, . . . , Mode 9) as listed hereinafter. That is, a particular subblock 38 may be predicted from a subblock above the current subblock that is currently decoded ("vertical prediction"), from the subblock to the left of the current subblock ("horizontal prediction"), or from both the left and the above subblocks ("diagonal prediction"). The Modes 1-8 predict the subblock in a predetermined direction and the Mode 0 uses a uniform average without prediction in a predetermined direction. In FIG. 3, each direction represents one of the eight prediction modes in accordance with the present invention.

Mode 0:

In this mode, each pixel a-p is predicted by the following equation:

$$a, b, c, d, \ldots, p = \frac{A+B+C+D+I+J+K+L+4}{8}.$$

It is contemplated that in this mode as well as in the following modes, a "division" means to round the result down toward "minus infinity" ($-\infty$). For instance, in mode 0, the term "+4" ensures that the division results in a rounding to the nearest integer. This applies also the other modes.

If four of the pixels a-p are outside the current picture (frame) that is currently encoded, the average of the remaining four pixels is used for prediction. If all eight pixels are outside the picture, the prediction for all pixels in this subblock is 128. A subblock may therefore always be predicted in mode 0.

Mode 1:

If the pixels A, B, C, D are inside the current picture, the pixels a-p are predicted in vertical direction as shown in FIG. 3. That is, the pixels a-p are predicted as follows:

| | |
|---|---|
| a, e, i, m = | A |
| b, f, j, n = | B |
| c, g, k, o = | C |
| d, h, l, p = | D |

Mode 2:

If the pixels I, J, K, L are inside the current picture, the pixels a-p are predicted in horizontal direction. That is, the pixels a-p are predicted as follows:

| | |
|---|---|
| a, b, c, d = | I |
| e, f, g, h = | J |
| i, j, k, l = | K |
| m, n, o, p = | L |

Mode 3:

This mode is used if all pixels a-p are inside the current picture. This corresponds to a prediction in a diagonal direction as shown in FIG. 3. The pixels a-p are predicted as follows:

| | |
|---|---|
| m = | (J + 2K + L + 2)/4 |
| i, n = | (I + 2J + K + 2)/4 |
| e, j, o = | (Q + 2I + J + 2)/4 |
| a, f, k, p = | (I + 2Q + A + 2)/4 |
| b, g, l = | (Q + 2A + B + 2)/4 |
| c, h = | (A + 2B + C + 2)/4 |
| d = | (B + 2C + D + 2)/4 |

Mode 4:

This mode is used if all pixels a-p are inside the current picture. This is also a diagonal prediction.

| | |
|---|---|
| a = | (A + 2B + C + I + 2J + K + 4)/8 |
| b, e = | (B + 2C + D + J + 2K + L + 4)/8 |
| c, f, i = | (C + 2D + E + K + 2L + M + 4)/8 |
| d, g, j, m = | (D + 2E + F + L + 2M + N + 4)/8 |
| h, k, n = | (E + 2F + G + M + 2N + O + 4)/8 |
| l, o = | (F + 2G + H + N + 2O + P + 4)/8 |
| p = | (G + H + O + P + 2)/4 |

Mode 5:

This mode is used if all pixels a-p are inside the current picture. This is also a diagonal prediction.

| | |
|---|---|
| a, j = | (Q + A + 1)/2 |
| b, k = | (A + B + 1)/2 |
| c, l = | (B + C + 1)/2 |
| d = | (C + D + 1)/2 |
| e, n = | (I + 2Q + A + 2)/4 |
| f, o = | (Q + 2A + B + 2)/4 |
| g, p = | (A + 2B + C + 2)/4 |
| h = | (B + 2C + D + 2)/4 |
| i = | (Q + 2I + J + 2)/4 |
| m = | (I + 2J + K + 2)/4 |

Mode 6:

This mode is used if all pixels a-p are inside the current picture. This is a diagonal prediction.

| | |
|---|---|
| a = | (2A + 2B + J + 2K + L + 4)/8 |
| b, i = | (B + C + 1)/2 |
| c, j = | (C + D + 1)/2 |
| d, k = | (D + E + 1)/2 |
| l = | (E + F + 1)/2 |
| e = | (A + 2B + C + K + 2L + M + 4)/8 |
| f, m = | (B + 2C + D + 2)/4 |
| g, n = | (C + 2D + E + 2)/4 |
| h, o = | (D + 2E + F + 2)/4 |
| p = | (E + 2F + G + 2)/4 |

Mode 7:

This mode is used if all pixels a-p are inside the current picture. This is a diagonal prediction.

| | |
|---|---|
| a = | (B + 2C + D + 2I + 2J + 4)/8 |
| b = | (C + 2D + E + I + 2J + K + 4)/8 |
| c, e = | (D + 2E + F + 2J + 2K + 4)/8 |
| d, f = | (E + 2F + G + J + 2K + L + 4)/8 |
| g, i = | (F + 2G + H + 2K + 2L + 4)/8 |
| h, j = | (G + 3H + K + 2L + M + 4)/8 |
| k, m = | (G + H + L + M + 2)/4 |
| l, n = | (L + 2M + N + 2)/4 |
| o = | (M + N + 1)/2 |
| p = | (M + 2N + O + 2)/2 |

Mode 8:

This mode is used if all pixels a-p are inside the current picture. This is a diagonal prediction.

| | |
|---|---|
| a, g = | (Q + I + 1)/2 |
| b, h = | (I + 2Q + A + 2)/4 |
| c = | (Q + 2A + B + 2)/4 |
| d = | (A + 2B + C + 2)/4 |
| e, k = | (I + J + 1)/2 |
| f, l = | (Q + 2I + J + 2)/4 |
| i, o = | (J + K + 1)/2 |
| j, p = | (I + 2J + K + 2)/4 |
| m = | (K + L + 1)/2 |
| n = | (J + 2K + L + 2)/2 |

In one embodiment of the present invention, a mode selection algorithm determines a criteria to select one of the nine modes. The subblock 38 is then encoded in accordance with the selected mode. The mode selection algorithm is described in detail below.

Figure 4:
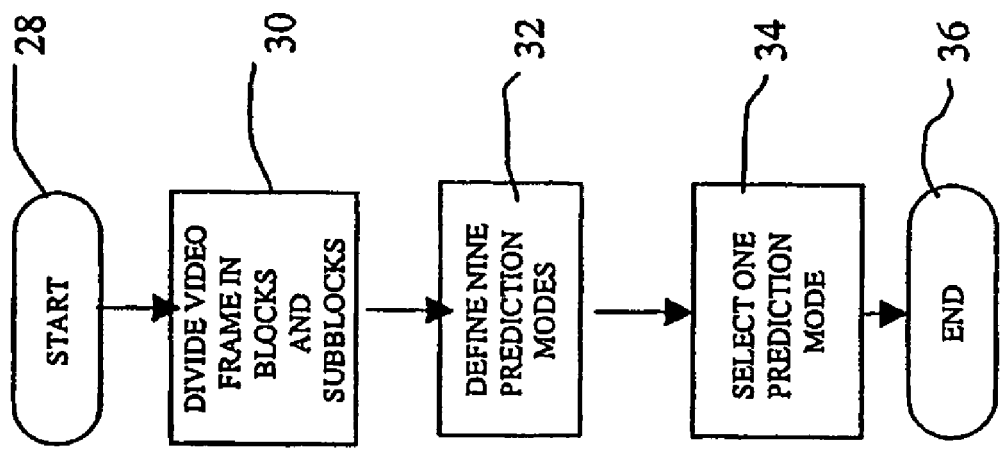
FIG. 4 is a flow chart in accordance with an embodiment of the present invention that selects a prediction mode.

FIG. 4 is a flow chart of a procedure illustrating the method in accordance with the present invention that codes video data including a stream of video frames and that selects one of the prediction modes Modes 0-8. In one embodiment, the method codes a luminance portion (Y) of a video frame.

In a step 28, e.g., when a user activates the video system 1, the procedure initializes the video system 1. The initialization procedure includes, for example, determining whether the encoder apparatus 3 is operating and properly connected to receive the stream of video frames.

In a step 30, the procedure receives the stream of video frames and divides each video frame into a matrix of a plurality of subblocks, wherein each subblock includes a plurality of pixels. The matrix of a plurality of subblocks may include 4×4 subblocks 38 that are part of a macroblock as described above.

In a step 32, the procedure defines the nine prediction modes Mode 0-8, wherein each prediction mode determines a mode according to which a present subblock is to be coded. For example, the procedure may execute a subroutine to calculate and define the modes Mode 0-8.

In a step 34, the procedure selects one of the nine prediction modes Mode 0-8 to encode the present subblock 38. In one embodiment, the procedure calculates for each mode an error value, determines which mode provides a minimum error value and selects that mode for encoding the present subblock 38.

Once the procedure has selected the "best" prediction mode to encode the pixels of the present subblock 38, the procedure encodes the minimum error value and transmits the encoded minimum error value within a compressed bitstream to the decoder. The minimum error value represents a difference between the predicted pixels of the present subblock and the original pixels of the subblock. The difference may be encoded using a DCT, coefficient quantization and variable length coding as known in the art. The decoder uses the predicted pixels and the difference to the original pixels to accurately reconstruct the video frame. The procedure ends at a step 36.

The procedure provides that each of the 4×4 subblocks 38 is coded in accordance with one of the nine prediction modes Mode 0-8. As this may require a considerable number of bits if coded directly, the video system 1 in accordance with the present invention may apply a more efficient way of coding the mode information. A prediction mode of a subblock is correlated with the prediction modes of adjacent subblocks.

Figure 5:
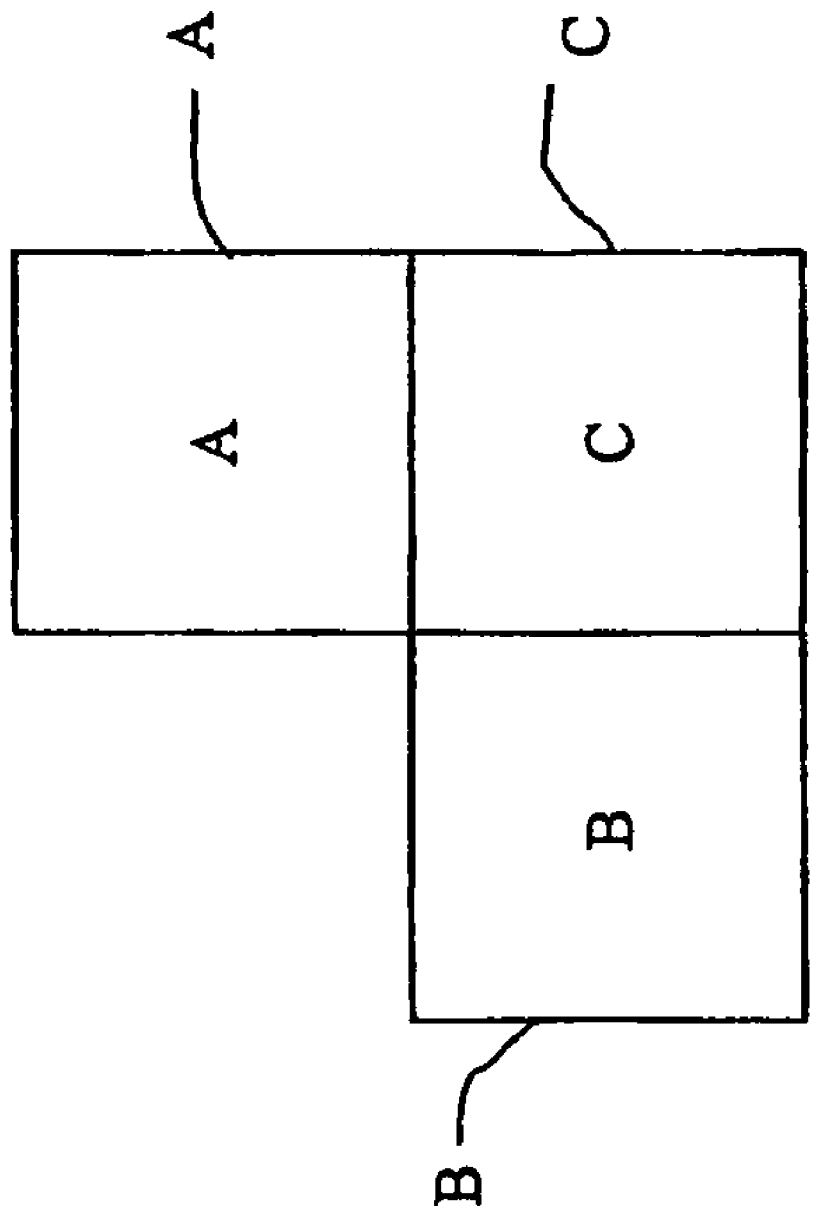
FIG. 5 is an illustration of three neighboring subblocks, wherein two subblocks are used to encode the third subblock.

FIG. 5 illustrates this through three exemplary subblocks A, B, C. The subblock C is the subblock that is to be encoded (predicted) with the help of the subblocks A, B whose prediction modes are known. The subblock A is located above the subblock C and the subblock B is located left of the subblock C. In this case, an ordering of the most probable, next most probable etc. prediction mode for the subblock C is given. An example of such an ordering table is listed hereinafter. The table is divided into ten groups (Group 1-Group 10). In each group, the respective prediction mode for the subblock A is constant (e.g., Mode 0 of the subblock A is constant in Group 2), and the prediction mode for the subblock B varies. That is, the (constant) prediction mode for the subblock A within a group may be combined with one of the nine prediction modes for the subblock B within that group.

For each combination of the prediction modes of the subblocks A and B, a sequence of nine numbers is given, one number for each of the nine Modes 0-9. For example in Group 3, if the prediction modes for the subblock A and the subblock B are both Mode 1, a string "1 6 2 5 3 0 4 8 7" indicates that the Mode 1, i.e., the first number in the string, is the most probable mode for the subblock C. The Mode 6, i.e., the second number in the string, is the next most probable mode. In the exemplary string, the Mode 7 is the least probable since the number 7 is the last number in the string. The string will be part of the stream of bits that represents the encoded video sequence.

The stream of bits therefore includes information (Prob0=1 (see Table 1)) indicating the mode used for the subblock C. For example, the information may indicate that the next most probable intra prediction mode is Mode 6. Note that a "–" in the table indicates that this instance cannot occur. The term "outside" used in the Table 1 indicates "outside the frame." If the subblock A or B is within the frame, but is not INTRA coded (e.g., in a P frame, the subblock C could be INTRA coded but either the subblock A or the subblock B may not be INTRA coded), there is no prediction mode. The procedure of the present invention assumes the Mode 0 for such subblocks.

TABLE 1

| B | A = outside | |
|---|---|---|
| outside | 0 – – – – – – – – | |
| mode 0 | 0 2 – – – – – – – | |
| mode 1 | – – – – – – – – – | |
| mode 2 | 2 0 – – – – – – – | |
| mode 3 | – – – – – – – – – | GROUP 1 |
| mode 4 | – – – – – – – – – | |
| mode 5 | – – – – – – – – – | |
| mode 6 | – – – – – – – – – | |
| mode 7 | – – – – – – – – – | |
| mode 8 | – – – – – – – – – | |
| B | A = mode 0 | |
| outside | 0 1 – – – – – – – | |
| mode 0 | 0 2 1 6 4 8 5 7 3 | |
| mode 1 | 1 0 2 6 5 4 3 8 7 | |
| mode 2 | 2 8 0 1 7 4 3 6 5 | |
| mode 3 | 2 0 1 3 8 5 4 7 6 | GROUP 2 |
| mode 4 | 2 0 1 4 6 7 8 3 5 | |
| mode 5 | 0 1 5 2 6 3 8 4 7 | |
| mode 6 | 0 1 6 2 4 7 5 8 3 | |
| mode 7 | 2 7 0 1 4 8 6 3 5 | |
| mode 8 | 2 8 0 1 7 3 4 5 6 | |
| B | A = mode 1 | |
| outside | 1 0 – – – – – – – | |
| mode 0 | 1 2 5 6 3 0 4 8 7 | |
| mode 1 | 1 6 2 5 3 0 4 8 7 | |
| mode 2 | 2 1 7 6 8 3 5 0 4 | |
| mode 3 | 1 2 5 3 6 8 4 7 0 | GROUP 3 |
| mode 4 | 1 6 2 0 4 5 8 7 3 | |
| mode 5 | 1 5 2 6 3 8 4 0 7 | |
| mode 6 | 1 6 0 2 4 5 7 3 8 | |
| mode 7 | 2 1 7 6 0 8 5 4 3 | |
| mode 8 | 1 2 7 8 3 4 5 6 0 | |
| B | A = mode 2 | |
| outside | – – – – – – – – – | |
| mode 0 | 0 2 1 8 7 6 5 4 3 | |
| mode 1 | 1 2 0 6 5 7 4 8 3 | |
| mode 2 | 2 8 7 1 0 6 4 3 5 | |
| mode 3 | 2 0 8 1 3 7 5 4 6 | GROUP 4 |
| mode 4 | 2 0 4 1 7 8 6 3 5 | |
| mode 5 | 2 0 1 5 8 4 6 7 3 | |
| mode 6 | 2 0 6 1 4 7 8 5 3 | |
| mode 7 | 2 7 8 1 0 5 4 6 3 | |
| mode 8 | 2 8 7 1 0 4 3 6 5 | |
| B | A = mode 3 | |
| outside | – – – – – – – – – | |
| mode 0 | 0 2 1 3 5 8 6 4 7 | |
| mode 1 | 1 0 2 5 3 6 4 8 7 | |
| mode 2 | 2 8 1 0 3 5 7 6 4 | |
| mode 3 | 3 2 5 8 1 4 6 7 0 | GROUP 5 |
| mode 4 | 4 2 0 6 1 5 8 3 7 | |
| mode 5 | 5 3 1 2 8 6 4 0 7 | |
| mode 6 | 1 6 0 2 4 5 8 3 7 | |
| mode 7 | 2 7 0 1 5 4 8 6 3 | |
| mode 8 | 2 8 3 5 1 0 7 6 4 | |
| B | A = mode 4 | |
| outside | – – – – – – – – – | |
| mode 0 | 2 0 6 1 4 7 5 8 3 | |
| mode 1 | 1 6 2 0 4 5 3 7 8 | |
| mode 2 | 2 8 7 6 4 0 1 5 3 | |
| mode 3 | 4 2 1 0 6 8 3 5 7 | GROUP 6 |
| mode 4 | 4 2 6 0 1 5 7 8 3 | |
| mode 5 | 1 2 5 0 6 3 4 7 8 | |
| mode 6 | 6 4 0 1 2 7 5 3 8 | |
| mode 7 | 2 7 4 6 0 1 8 5 3 | |
| mode 8 | 2 8 7 4 6 1 3 5 0 | |
| B | A = mode 5 | |
| outside | – – – – – – – – – | |
| mode 0 | 5 1 2 3 6 8 0 4 7 | |
| mode 1 | 1 5 6 3 2 0 4 8 7 | |
| mode 2 | 2 1 5 3 6 8 7 4 0 | |
| mode 3 | 5 3 1 2 6 8 4 7 0 | GROUP 7 |
| mode 4 | 1 6 2 4 5 8 0 3 7 | |
| mode 5 | 5 1 3 6 2 0 8 4 7 | |
| mode 6 | 1 6 5 2 0 4 3 7 8 | |
| mode 7 | 2 7 1 6 5 0 8 3 4 | |
| mode 8 | 2 5 1 3 6 8 4 0 7 | |
| B | A = mode 6 | |
| outside | – – – – – – – – – | |
| mode 0 | 1 6 2 0 5 4 3 7 8 | |
| mode 1 | 1 6 5 4 2 3 0 7 8 | |
| mode 2 | 2 1 6 7 4 8 5 3 0 | |

TABLE 1-continued

| | | |
|---|---|---|
| mode 3 | 2 1 6 5 8 4 3 0 7 | GROUP 8 |
| mode 4 | 6 4 1 2 0 5 7 8 3 | |
| mode 5 | 1 6 5 2 3 0 4 8 7 | |
| mode 6 | 6 1 4 0 2 7 5 3 8 | |
| mode 7 | 2 7 4 6 1 5 0 8 3 | |
| mode 8 | 2 1 6 8 4 7 3 5 0 | |
| B | A = mode 7 | |
| outside | - - - - - - - - - | |
| mode 0 | 2 0 4 7 6 1 8 5 3 | |
| mode 1 | 6 1 2 0 4 7 5 8 3 | |
| mode 2 | 2 7 8 0 1 6 4 3 5 | |
| mode 3 | 2 4 0 8 3 1 7 6 5 | GROUP 9 |
| mode 4 | 4 2 7 0 6 1 8 5 3 | |
| mode 5 | 2 1 0 8 5 6 7 4 3 | |
| mode 6 | 2 6 4 1 7 0 5 8 3 | |
| mode 7 | 2 7 4 0 8 6 1 5 3 | |
| mode 8 | 2 8 7 4 1 0 3 6 5 | |
| B | A = mode 8 | |
| outside | - - - - - - - - - | |
| mode 0 | 2 0 8 1 3 4 6 5 7 | |
| mode 1 | 1 2 0 6 8 5 7 3 4 | |
| mode 2 | 2 8 7 1 0 3 6 5 4 | |
| mode 3 | 8 3 2 5 1 0 4 7 6 | GROUP 10 |
| mode 4 | 2 0 4 8 5 1 7 6 3 | |
| mode 5 | 2 1 0 8 5 3 6 4 7 | |
| mode 6 | 2 1 6 0 8 4 5 7 3 | |
| mode 7 | 2 7 8 4 0 6 1 5 3 | |
| mode 8 | 2 8 3 0 7 4 1 6 5 | |

The information about the prediction modes may be efficiently coded by combining prediction mode information of two subblocks 38 in one codeword. The stream of bits includes then the resulting codewords, wherein each codeword represents the prediction modes of the two subblocks. Table 2 lists exemplary binary codewords for code numbers (Code No.) between 0 and 80. The probability of a mode of the first subblock is indicated as Prob0 and the probability of a mode of the second subblock is indicated as Prob1.

TABLE 2

| Code No. | Prob0 | Prob1 | Codeword |
|---|---|---|---|
| 0 | 0 | 0 | 1 |
| 1 | 0 | 1 | 001 |
| 2 | 1 | 0 | 011 |
| 3 | 1 | 1 | 00001 |
| 4 | 0 | 2 | 00011 |
| 5 | 2 | 0 | 01001 |
| 6 | 0 | 3 | 01011 |
| 7 | 3 | 0 | 0000001 |
| 8 | 1 | 2 | 0000011 |
| 9 | 2 | 1 | 0001001 |
| 10 | 0 | 4 | 0001011 |
| 11 | 4 | 0 | 0100001 |
| 12 | 3 | 1 | 0100011 |
| 13 | 1 | 3 | 0101001 |
| 14 | 0 | 5 | 0101011 |
| 15 | 5 | 0 | 000000001 |
| 16 | 2 | 2 | 000000011 |
| 17 | 1 | 4 | 000001001 |
| 18 | 4 | 1 | 000001011 |
| 19 | 0 | 6 | 000100001 |
| 20 | 3 | 2 | 000100011 |
| 21 | 1 | 5 | 000101001 |
| 22 | 2 | 3 | 000101011 |
| 23 | 5 | 1 | 010000001 |
| 24 | 6 | 0 | 010000011 |
| 25 | 0 | 7 | 010001001 |
| 26 | 4 | 2 | 010001011 |
| 27 | 2 | 4 | 010100001 |
| 28 | 3 | 3 | 010100011 |
| 29 | 6 | 1 | 010101001 |
| 30 | 1 | 6 | 010101011 |
| 31 | 7 | 0 | 00000000001 |

TABLE 2-continued

| Code No. | Prob0 | Prob1 | Codeword |
|---|---|---|---|
| 32 | 0 | 8 | 00000000011 |
| 33 | 5 | 2 | 00000001001 |
| 34 | 4 | 3 | 00000001011 |
| 35 | 2 | 5 | 00000100001 |
| 36 | 3 | 4 | 00000100011 |
| 37 | 1 | 7 | 00000101001 |
| 38 | 4 | 4 | 00000101011 |
| 39 | 7 | 1 | 00010000001 |
| 40 | 8 | 0 | 00010000011 |
| 41 | 6 | 2 | 00010001001 |
| 42 | 3 | 5 | 00010001011 |
| 43 | 5 | 3 | 00010100001 |
| 44 | 2 | 6 | 00010100011 |
| 45 | 1 | 8 | 00010101001 |
| 46 | 2 | 7 | 00010101011 |
| 47 | 7 | 2 | 01000000001 |
| 48 | 8 | 1 | 01000000011 |
| 49 | 5 | 4 | 01000001001 |
| 50 | 4 | 5 | 01000001011 |
| 51 | 3 | 6 | 01000100001 |
| 52 | 6 | 3 | 01000100011 |
| 53 | 8 | 2 | 01000101001 |
| 54 | 4 | 6 | 01000101011 |
| 55 | 5 | 5 | 01010000001 |
| 56 | 6 | 4 | 01010000011 |
| 57 | 2 | 8 | 01010001001 |
| 58 | 7 | 3 | 01010001011 |
| 59 | 3 | 7 | 01010100001 |
| 60 | 6 | 5 | 01010100011 |
| 61 | 5 | 6 | 01010101001 |
| 62 | 7 | 4 | 01010101011 |
| 63 | 4 | 7 | 0000000000001 |
| 64 | 8 | 3 | 0000000000011 |
| 65 | 3 | 8 | 0000000001001 |
| 66 | 7 | 5 | 0000000001011 |
| 67 | 8 | 4 | 0000000100001 |
| 68 | 5 | 7 | 0000000100011 |
| 69 | 4 | 8 | 0000000101001 |
| 70 | 6 | 6 | 0000000101011 |
| 71 | 7 | 6 | 0000010000001 |
| 72 | 5 | 8 | 0000010000011 |
| 73 | 8 | 5 | 0000010001001 |
| 74 | 6 | 7 | 0000010001011 |
| 75 | 8 | 6 | 0000010100001 |
| 76 | 7 | 7 | 0000010100011 |
| 77 | 6 | 8 | 0000010101001 |
| 78 | 8 | 7 | 0000010101011 |
| 79 | 7 | 8 | 0001000000001 |
| 80 | 8 | 8 | 0001000000011 |

With the nine prediction modes (Table 1) and the probabilities of the modes (Table 1, Table 2), a mode selection algorithm determines the mode according to which a particular subblock is predicted. In one embodiment of the present invention, the algorithm selects the mode using a sum of absolute differences (SAD) between the pixels a-p and the corresponding pixels in the original frame, and the above probabilities of the modes. The SAD and the probability table are used to select the mode for a particular subblock 38. The algorithm calculates a parameter uError for each of the nine possible modes Mode 0-8. The mode that provides the smallest uError is the mode selected for the subblock 38.

The uError is calculated as follows:

$$uError = SAD(\{a, \ldots, p\}, \{original\ frame\}) + rd\_quant[uMBQP] * uProb,$$

where $SAD(\{a, \ldots, p\}, \{original\ frame\})$ is the sum of absolute difference between the pixels a-p and the corresponding pixels in the original frame, where rd_quant[uMBQP] is a table of constant values indexed by a quantization parameter uMBQP. uMBQP is given by const U8 rd_quant[32]={1,1,1,1,1,1,2,2,2,2,3,3,3,4,4, 5,5,6,7,7,8,9,11,12,13,15,17,19,21,24,27,30};
and where uProb is the probability of the mode occurring, provided by the position in the mode probability table (Table 1).

For example, the prediction mode for the subblocks A is the Mode 1 and the prediction mode for the subblock B is the Mode 1. The string "1 6 2 5 3 0 4 8 7" indicates that the Mode 1 is also the most probable mode for the subblock C. The Mode 6 is the second most probable mode, etc. Thus, when the algorithm calculates uError for the Mode 0, the probability uProb is 5. Further, for the Mode 1 the probability uProb is 0, for the Mode 2 the probability uProb is 2, for the Mode 3 the probability uProb is 4, and so forth.

In addition to coding the luminance portion (Y) of the video frame, the video system 1 of the present invention may also predict the chrominance portions (U, V) of the video frame. The chrominance portions may be considered as chrominance planes (U and V-planes). Typically, the chrominance planes (U and V-planes) are a quarter of the size of a luminance plane. Thus, in a 16×16 macroblock a corresponding 8×8 block of pixels exists in both the U and V-planes. These 8×8 blocks are divided into 4×4 blocks. In general, separate prediction modes are not transmitted for chrominace blocks. Instead, the modes transmitted for the Y-plane blocks are used as prediction modes for the U and V-plane blocks.

Figure 6:
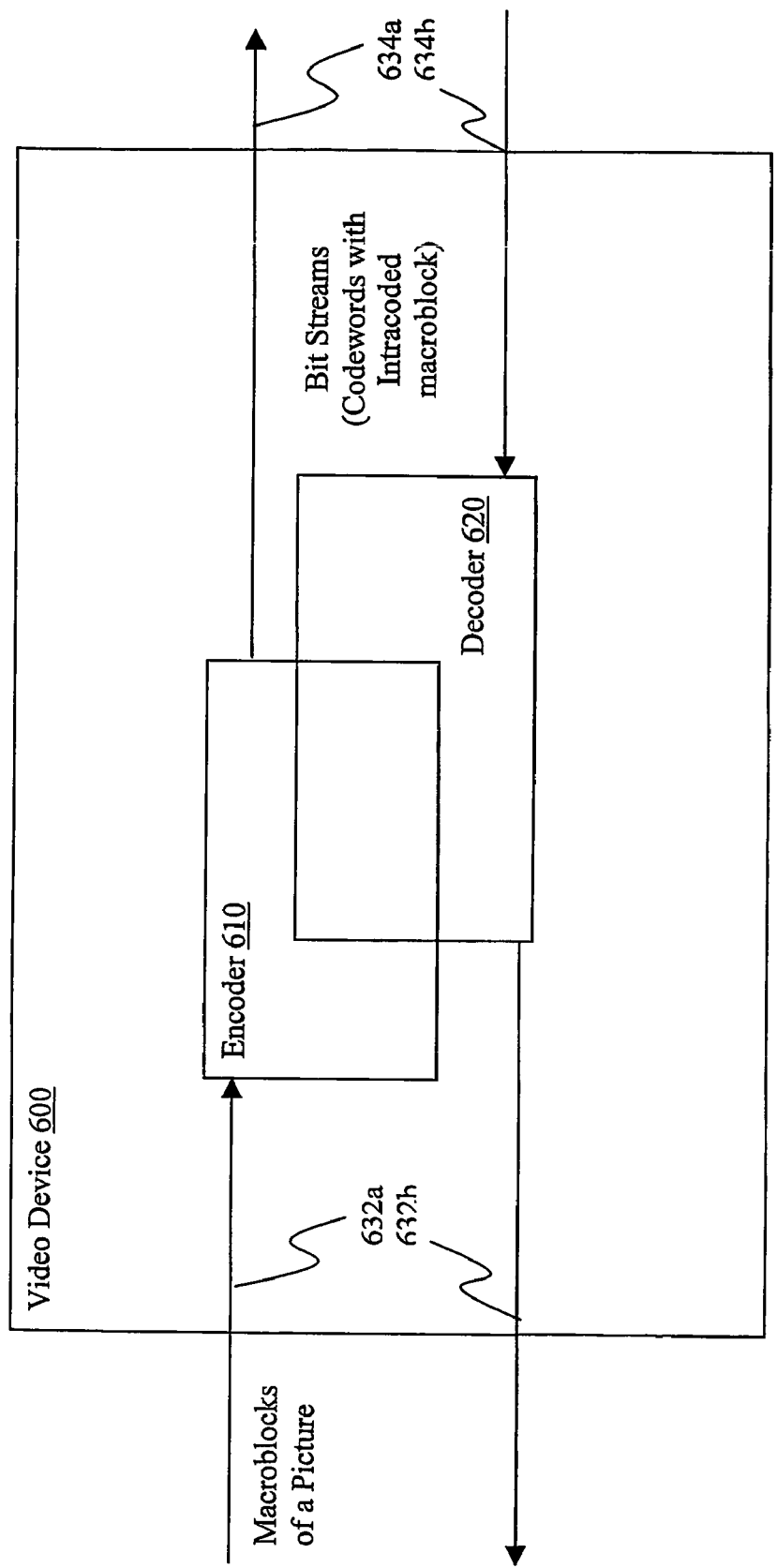
FIG. 6 illustrates a video device having an encoder and a decoder incorporated with the encoding/decoding teachings of the present invention, in accordance with one embodiment.

FIG. 6 illustrates a video device incorporated with the teachings of the present invention, in accordance with one embodiment. As illustrated, video device 600 includes encoder 610 and decoder 620 coupled to the inputs and outputs of the device. As described earlier, encoder 610 is designed to receive video frame data, divide the respective frame data into macroblocks and subblocks, and selectively intracode the subblocks as earlier described. Decoder 620 is designed to receive the intracoded subblocks and recover the video frame data as earlier described.

Encoder 610 and decoder 620 are similarly constituted as the earlier described encoder apparatus 1 and decoder apparatus 5. In various embodiments, encoder 610 and decoder 620 may share at least in part their constituting tables and coding/decoding logics (as denoted by the intersecting blocks of encoder 610 and decoder 620).

In various embodiments, video device 600 may be a wireless mobile phone, a palm sized computing device, such as a personal digital assistant, a laptop computing device, a desktop computing device, a server, and other computing devices of the like. In other embodiments, video device 600 may be a circuit board component, such as a video "add-on" circuit board (also referred to as a daughter circuit board), a motherboard, and other circuit boards of the like.

In yet other embodiments, instead of having both encoder 610 and decoder 620, video device 600 may include encoder 610 only, as in the case of a video camera, or decoder 620 only, as in the case of a DVD player, a television, a display monitor, or a set-top box.

Figure 7:
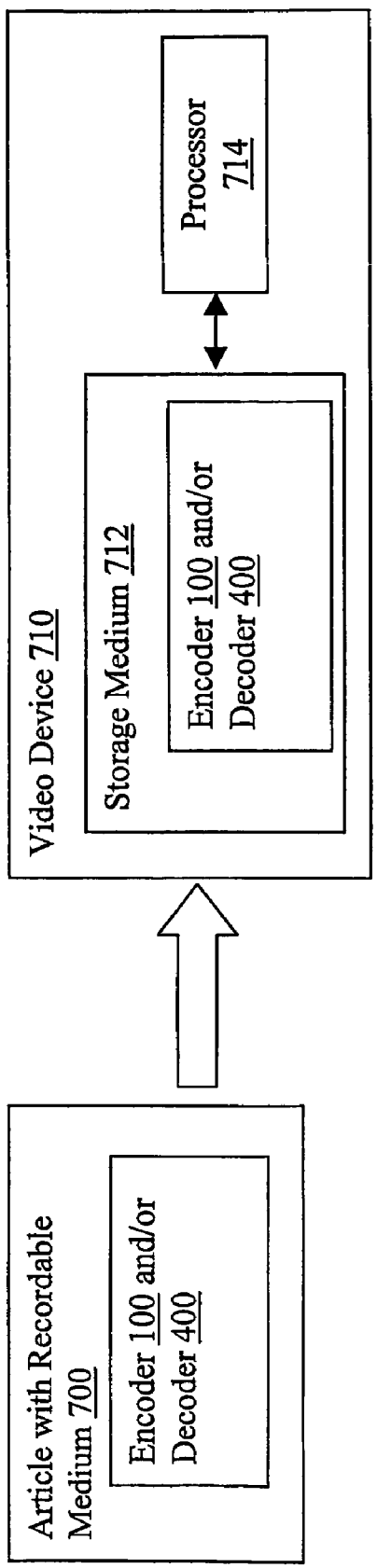
FIG. 7 illustrates an article of manufacture with a recordable medium having a software implementation of the encoder/decoder of the present invention, designed for use to program a device to equip the device with the encoding/decoding capability of the present invention, in accordance with one embodiment.

FIG. 7 illustrates an article of manufacture including a recordable medium 700 having programming instructions implementing a software embodiment of the earlier described encoder apparatus 1 and/or decoder apparatus 5. The programming instructions are designed for use to program video device 710 to equip video device 710 with the encoding and decoding capabilities of the present invention.

For the embodiment, video device 710 include storage medium 712 to store at least a portion of a working copying of the programming instructions implementing the software embodiment of encoder apparatus 1 and/or decoder 5, and at least one processor 714 coupled to storage medium 712 to execute the programming instructions.

Video device 712 may be any one of the earlier enumerated example device devices or other video devices of the like. Article 710 may e.g. be a diskette, a compact disk (CD), a DVD or other computer readable medium of the like. In other embodiments, article 710 may be a distribution server distributing encoder apparatus 1 and/or decoder apparatus 5 on line, via private and/or public networks, such as the Internet. In one embodiment, article 710 is a web server.

Figure 8:
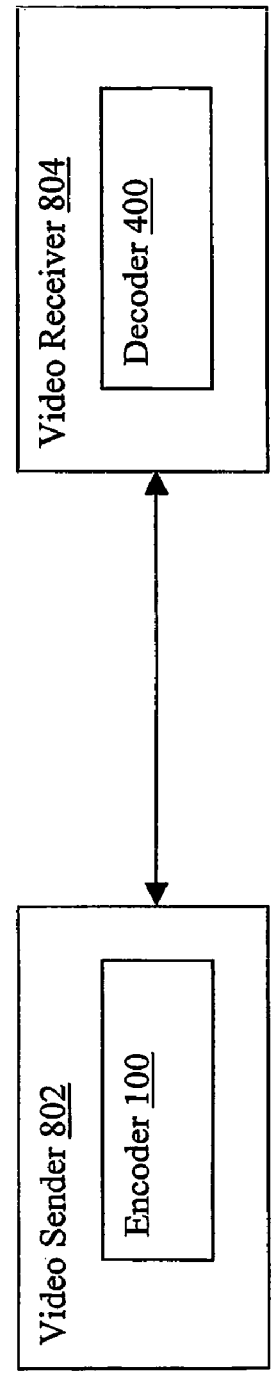
FIG. 8 illustrates a system having a video sender device and a video receiver device incorporated with the encoding/decoding teachings of the present invention, in accordance with one embodiment.

FIG. 8 illustrates an example system having video sender 802 and video receiver 804 communicatively coupled to each other as shown, with video sender 802 encoding a video in accordance with the teachings of the present invention, and providing the encoded video to video receiver 802, and video receiver 802, in turn decoding the encoded video to render the video. Video sender 802 and video receiver 804 are equipped with the earlier described encoder apparatus 1 and decoder apparatus 5 respectively.

An example of video sender 802 is a video server, whereas an example of a video receiver 804 is a client device coupled to video sender 802.

In various alternate embodiments, encoding for Modes 4 and 6 are streamlined to employ only the pixels of the adjacent subblocks above the subblock being encoded in predicting the pixel values of the subblock being encoded. More specifically, the pixel values of the subblock being encoded are predicted under modes 4 and 6 as follows:

Streamlined Mode 4

$$a=(A+2*B+C+2)/4;$$

$$b,e=(B+2*C+D+2)/4;$$

$$c,f,i=(C+2*D+E+2)/4;$$

$$d,g,j,m=(D+2*E+F+2)/4;$$

$$h,k,n=(E+2*F+G+2)\ 4;$$

$$l,o=(F+2*G+H+2)/4;$$

$$p=(G+3*H+2)/4;$$

Streamlined Mode 6

$$a=(A+B+1)/2;$$

$$b,i=(B+C+1)/2;$$

$$c,j=(C+D+1)/2;$$

$$d,k=(D+E+1)/2;$$

$$l=(E+F+1)/2;$$

$$e=(A+2*B+C+2)/4;$$

$$f,m=(B+2*C+D+2)/4;$$

$g,n=(C+2*D+E+2)/4;$ $h,o=(D+2*E+F+2)/4;$ $p=(E+2*F+G+2)/4;$

Further, encoding for Mode 7 is streamlined to employ only the pixels of the adjacent subblock to the left of the subblock being encoded in predicting the pixel values of the subblock being encoded. More specifically, the pixel values of the subblock being encoded are predicted as follows:

Streamlined Mode 7

$a=(I+J+1)/2;$ $b=(I+2*J+K+2)/4;$ $c,e=(J+K+1)/2;$ $d,f=(J+2*K+L+2)/4;$ $g,i=(K+L+1)/2;$ $h,j=(K+2*L+L+2)/4;$ l,n,k, m,o,p=L;

In yet other embodiments, a macroblock may be subdivided into M×N subblocks where M×N may be 8×8, 8×4 or 4×8 instead. For the purpose of this portion of the description, as illustrated in FIGS. 9a-9c, a pixel of a M×N subblock shall be referred to as $p_{ij}$, where the index i denotes a row position of the subblock and may assume a value of 1 through 8 in the cases of 8×8 and 8×4 subblocks or 1 through 4 in the case of 4×8 subblocks, and the index j denotes a column position of the subblock and may likewise assume a value of 1 through 8 in the cases of 8×8 and 4×8 subblocks or 1 through 4 in the case of 8×4 subblocks.

As illustrated, the predictor pixels of the adjacent subblocks above the subblock being encoded are referred to as $t_0$ through $t_{15}$, and the predictor pixels of the adjacent subblocks to the left of the subblock being encoded are referred to as $l_0$ through $l_{15}$.

For Modes 0-2, pixel values of a M×N subblock, whether M×N is 8×8, 8×4, or 4×8, are predicted as follows:

Mode 0

Where $t_0$-$t_N$ and $l_0$-$l_M$ are available, $P_{ij}=(t_0+\ldots+t_N+l_0+\ldots+l_M+N/2+M/2)/(M+N);$ Else if only $t_0$-$t_N$ are available, $P_{ij}=(t_0+\ldots+t_N+N/2)/N;$ Else if only $l_0$-$l_M$ are available, $P_{ij}=(l_0+\ldots+l_M+M/2)/M;$ Else $P_{ij}=128;$ $i=0-(N-1), j=0-(M-1).$ Mode 1

Where $t_0$-$t_N$ are available $P_{ij}=t_j;$ $i=0-(N-1), j=0-(M-1).$

Mode 2

Where l0–lN are available

Pij=li;

$i=0-(N-1), j=0-(M-1).$

For Modes 3-8, a pixel value of a M×N subblock is predicted as follows:

Mode 3

Where all $t_0$-$t_N$ and $l_0$-$l_M$ are available for prediction

| 4 × 8 subblock | 8 × 4 subblock | 8 × 8 subblock | predicted by |
|---|---|---|---|
| — | $p_{07}$ | $p_{07}$ | $(t_5 + t_6 << 1 + t_7 + 2) >> 2$ |
| — | $p_{06}, p_{17}$ | $p_{06}, p_{17}$ | $(t_4 + t_5 << 1 + t_6 + 2) >> 2$ |
| — | $p_{05}, p_{16}, p_{27}$ | $p_{05}, p_{16}, p_{27}$ | $(t_3 + t_4 << 1 + t_5 + 2) >> 2$ |
| — | $p_{04}, p_{15}, p_{26}, p_{37}$ | $p_{04}, p_{15}, p_{26}, p_{37}$ | $(t_2 + t_3 << 1 + t_4 + 2) >> 2$ |
| $p_{03}$ | $p_{03}, p_{14}, p_{25}, p_{36}$ | $p_{03}, p_{14}, p_{25}, p_{36}, p_{47}$ | $(t_1 + t_2 << 1 + t_3 + 2) >> 2$ |
| $p_{02}, p_{13}$ | $p_{02}, p_{13}, p_{24}, p_{35}$ | $p_{02}, p_{13}, p_{24}, p_{35}, p_{46}, p_{57}$ | $(t_0 + t_1 << 1 + t_2 + 2) >> 2$ |
| $p_{01}, p_{12}, p_{23}$ | $p_{01}, p_{12}, p_{23}, p_{34}$ | $p_{01}, p_{12}, p_{23}, p_{34}, p_{45}, p_{56}, p_{67}$ | $(q + t_0 << 1 + t_1 + 2) >> 2$ |
| $p_{00}, p_{11}, p_{22}, p_{33}$ | $p_{00}, p_{11}, p_{22}, p_{33}$ | $p_{00}, p_{11}, p_{22}, p_{33}, p_{44}, p_{55}, p_{66}, p_{77}$ | $(l_0 + q << 1 + t_0 + 2) >> 2$ |
| $p_{10}, p_{21}, p_{32}, p_{43}$ | $p_{10}, p_{21}, p_{32}$ | $p_{10}, p_{21}, p_{32}, p_{43}, p_{54}, p_{65}, p_{76}$ | $(l_1 + l_0 << 1 + q + 2) >> 2$ |
| $p_{20}, p_{31}, p_{42}, p_{53}$ | $p_{20}, p_{31}$ | $p_{20}, p_{31}, p_{42}, p_{53}, p_{64}, p_{75}$ | $(l_2 + l_1 << 1 + l_0 + 2) >> 2$ |
| $p_{30}, p_{41}, p_{52}, p_{63}$ | $p_{30}$ | $p_{30}, p_{41}, p_{52}, p_{63}, p_{74}$ | $(l_3 + l_2 << 1 + l_1 + 2) >> 2$ |
| $p_{40}, p_{51}, p_{62}, p_{73}$ | — | $p_{40}, p_{51}, p_{62}, p_{73}$ | $(l_4 + l_3 << 1 + l_2 + 2) >> 2$ |
| $p_{50}, p_{61}, p_{72}$ | — | $p_{50}, p_{61}, p_{72}$ | $(l_5 + l_4 << 1 + l_3 + 2) >> 2$ |
| $p_{60}, p_{71}$ | — | $p_{60}, p_{71}$ | $(l_6 + l_5 << 1 + l_4 + 2) >> 2$ |
| $p_{70}$ | — | $p_{70}$ | $(l_7 + l_6 << 1 + l_5 + 2) >> 2$ |

Mode 4
Where all $t_0$-$t_N$ and $l_0$-$l_N$ are available for prediction,

| 4 × 8 subblock | 8 × 4 subblock | 8 × 8 subblock | predicted by |
|---|---|---|---|
| $p_{00}$ | $p_{00}$ | $p_{00}$ | $(t_2 + t_1 << 1 + t_0 + 2) >> 2$ |
| $p_{01}, p_{10}$ | $p_{01}, p_{10}$ | $p_{01}, p_{10}$ | $(t_3 + t_2 << 1 + t_1 + 2) >> 2$ |
| $p_{02}, p_{11}, p_{20}$ | $p_{02}, p_{11}, p_{20}$ | $p_{02}, p_{11}, p_{20}$ | $(t_4 + t_3 << 1 + t_2 + 2) >> 2$ |
| $p_{03}, p_{12}, p_{21}, p_{30}$ | $p_{03}, p_{12}, p_{21}, p_{30}$ | $p_{03}, p_{12}, p_{21}, p_{30}$ | $(t_5 + t_4 << 1 + t_3 + 2) >> 2$ |
| $p_{13}, p_{22}, p_{31}, p_{40}$ | $p_{04}, p_{13}, p_{22}, p_{31}$ | $p_{04}, p_{13}, p_{22}, p_{31}, p_{40}$ | $(t_6 + t_5 << 1 + t_4 + 2) >> 2$ |
| $p_{23}, p_{32}, p_{42}, p_{50}$ | $p_{05}, p_{14}, p_{23}, p_{32}$ | $p_{05}, p_{14}, p_{23}, p_{32}, p_{41}, p_{50}$ | $(t_7 + t_6 << 1 + t_5 + 2) >> 2$ |
| $p_{33}, p_{42}, p_{51}, p_{60}$ | $p_{06}, p_{15}, p_{24}, p_{33}$ | $p_{06}, p_{15}, p_{24}, p_{33}, p_{42}, p_{51}, p_{60}$ | $(t_8 + t_7 << 1 + t_6 + 2) >> 2$ |
| $p_{43}, p_{52}, p_{61}, p_{70}$ | $p_{07}, p_{16}, p_{25}, p_{34}$ | $p_{07}, p_{16}, p_{25}, p_{34}, p_{43}, p_{52}, p_{61}, p_{70}$ | $(t_9 + t_8 << 1 + t_7 + 2) >> 2$ |
| $p_{53}, p_{62}, p_{71}$ | $p_{17}, p_{26}, p_{35}$ | $p_{17}, p_{26}, p_{35}, p_{44}, p_{53}, p_{62}, p_{71}$ | $(t_{10} + t_9 << 1 + t_8 + 2) >> 2$ |
| $p_{63}, p_{72}$ | $p_{27}, p_{36}$ | $p_{27}, p_{36}, p_{45}, p_{54}, p_{63}, p_{72}$ | $(t_{11} + t_{10} << 1 + t_9 + 2) >> 2$ |
| $p_{73}$ | $p_{37}$ | $p_{37}, p_{46}, p_{55}, p_{64}, p_{73}$ | $(t_{12} + t_{11} << 1 + t_{10} + 2) >> 2$ |
| — | — | $p_{47}, p_{56}, p_{65}, p_{74}$ | $(t_{13} + t_{12} << 1 + t_{11} + 2) >> 2$ |
| — | — | $p_{57}, p_{66}, p_{75}$ | $(t_{14} + t_{13} << 1 + t_{12} + 2) >> 2$ |
| — | — | $p_{67}, p_{76}$ | $(t_{15} + t_{14} << 1 + t_{13} + 2) >> 2$ |
| — | — | $p_{77}$ | $(t_{15} + t_{15} << 1 + t_{14} + 2) >> 2$ |

Mode 5
Where all $t_0$-$t_N$ and $l_0$-$l_M$ are available for prediction, then

| 4 × 8 subblock | 8 × 4 subblock | 8 × 8 subblock | predicted by |
|---|---|---|---|
| — | $p_{07}$ | $p_{07}$ | $(t_6 + t_7 + 1) >> 1$ |
| — | $p_{17}$ | $p_{17}$ | $(t_5 + t_6 << 1 + t_7 + 2) >> 2$ |
| — | $p_{06}, p_{27}$ | $p_{06}, p_{27}$ | $(t_5 + t_6 + 1) >> 1$ |
| — | $p_{16}, p_{37}$ | $p_{16}, p_{37}$ | $(t_4 + t_5 << 1 + t_6 + 2) >> 2$ |
| — | $p_{05}, p_{25}$ | $p_{05}, p_{26}, p_{47}$ | $(t_4 + t_5 + 1) >> 1$ |
| — | $p_{15}, p_{36}$ | $p_{15}, p_{36}, p_{57}$ | $(t_3 + t_4 << 1 + t_5 + 2) >> 2$ |
| — | $p_{04}, p_{25}$ | $p_{04}, p_{25}, p_{46}, p_{67}$ | $(t_3 + t_4 + 1) >> 1$ |
| — | $p_{14}, p_{35}$ | $p_{14}, p_{35}, p_{56}, p_{77}$ | $(t_2 + t_3 << 1 + t_4 + 2) >> 2$ |
| $p_{03}$ | $p_{03}, p_{24}$ | $p_{03}, p_{24}, p_{45}, p_{66}$ | $(t_2 + t_3 + 1) >> 1$ |
| $p_{13}$ | $p_{13}, p_{34}$ | $p_{13}, p_{34}, p_{55}, p_{76}$ | $(t_1 + t_2 << 1 + t_3 + 2) >> 2$ |
| $p_{02}, p_{23}$ | $p_{02}, p_{23}$ | $p_{02}, p_{23}, p_{44}, p_{65}$ | $(t_1 + t_2 + 1) >> 1$ |
| $p_{12}, p_{33}$ | $p_{12}, p_{33}$ | $p_{12}, p_{33}, p_{54}, p_{75}$ | $(t_0 + t_1 << 1 + t_2 + 2) >> 2$ |
| $p_{01}, p_{22}, p_{43}$ | $p_{01}, p_{22}$ | $p_{01}, p_{22}, p_{43}, p_{64}$ | $(t_0 + t_1 + 1) >> 1$ |
| $p_{11}, p_{32}, p_{53}$ | $p_{11}, p_{32}$ | $p_{11}, p_{32}, p_{53}, p_{74}$ | $(q + t_0 << 1 + t_1 + 2) >> 2$ |
| $p_{00}, p_{21}, p_{42}, p_{63}$ | $p_{00}, p_{21}$ | $p_{00}, p_{21}, p_{42}, p_{63}$ | $(q + t_0 + 1) >> 1$ |
| $p_{10}, p_{31}, p_{52}, p_{73}$ | $p_{10}, p_{31}$ | $p_{10}, p_{31}, p_{52}, p_{73}$ | $(l_0 + q << 1 + t_0 + 2) >> 2$ |
| $p_{20}, p_{41}, p_{62}$ | $p_{20}$ | $p_{20}, p_{41}, p_{62}$ | $(l_1 + l_0 << 1 + q + 2) >> 2$ |
| $p_{30}, p_{51}, p_{72}$ | $p_{30}$ | $p_{30}, p_{51}, p_{72}$ | $(l_2 + l_1 << 1 + l_0 + 2) >> 2$ |
| $p_{40}, p_{61}$ | — | $p_{40}, p_{61}$ | $(l_3 + l_2 << 1 + l_1 + 2) >> 2$ |
| $p_{50}, p_{71}$ | — | $p_{50}, p_{71}$ | $(l_4 + l_3 << 1 + l_2 + 2) >> 2$ |
| $p_{60}$ | — | $p_{60}$ | $(l_5 + l_4 << 1 + l_3 + 2) >> 2$ |
| $p_{70}$ | — | $p_{70}$ | $(l_6 + l_5 << 1 + l_4 + 2) >> 2$ |

Mode 6
Where all $t_0$-$t_N$ and $l_0$-$l_M$ are available for prediction

| 4 × 8 subblock | 8 × 4 sub-block | 8 × 8 subblock | predicted by |
|---|---|---|---|
| $p_{00}$ | $p_{00}$ | $p_{00}$ | $(t_0 + t_1 + 1) >> 1$ |
| $p_{10}$ | $p_{10}$ | $p_{10}$ | $(t_0 + t_1 << 1 + t_2 + 2) >> 2$ |
| $p_{01}, p_{20}$ | $p_{01}, p_{20}$ | $p_{01}, p_{20}$ | $(t_1 + t_2 + 1) >> 1$ |
| $p_{11}, p_{30}$ | $p_{11}, p_{30}$ | $p_{11}, p_{30}$ | $(t_1 + t_2 << 1 + t_3 + 2) >> 2$ |
| $p_{02}, p_{21}, p_{40}$ | $p_{02}, p_{21}$ | $p_{02}, p_{21}, p_{40}$ | $(t_2 + t_3 + 1) >> 1$ |
| $p_{12}, p_{31}, p_{50}$ | $p_{12}, p_{31}$ | $p_{12}, p_{31}, p_{50}$ | $(t_2 + t_3 << 1 + t_4 + 2) >> 2$ |
| $p_{03}, p_{22}, p_{41}, p_{60}$ | $p_{03}, p_{22}$ | $p_{03}, p_{22}, p_{41}, p_{60}$ | $(t_3 + t_4 + 1) >> 1$ |
| $p_{13}, p_{32}, p_{51}, p_{70}$ | $p_{13}, p_{32}$ | $p_{13}, p_{32}, p_{51}, p_{70}$ | $(t_3 + t_4 << 1 + t_5 + 2) >> 2$ |
| $p_{23}, p_{42}, p_{61}$ | $p_{04}, p_{23}$ | $p_{04}, p_{23}, p_{42}, p_{61}$ | $(t_4 + t_5 + 1) >> 1$ |
| $p_{33}, p_{52}, p_{71}$ | $p_{14}, p_{33}$ | $p_{14}, p_{33}, p_{52}, p_{71}$ | $(t_4 + t_5 << 1 + t_6 + 2) >> 2$ |
| $p_{43}, p_{62}$ | $p_{05}, p_{24}$ | $p_{05}, p_{24}, p_{43}, p_{62}$ | $(t_5 + t_6 + 1) >> 1$ |
| $p_{53}, p_{72}$ | $p_{15}, p_{34}$ | $p_{15}, p_{34}, p_{53}, p_{72}$ | $(t_5 + t_6 << 1 + t_7 + 2) >> 2$ |
| $p_{63}$ | $p_{06}, p_{25}$ | $p_{06}, p_{25}, p_{44}, p_{63}$ | $(t_6 + t_7 + 1) >> 1$ |
| $p_{73}$ | $p_{16}, p_{35}$ | $p_{16}, p_{35}, p_{54}, p_{73}$ | $(t_6 + t_7 << 1 + t_8 + 2) >> 2$ |
| — | $p_{07}, p_{26}$ | $p_{07}, p_{26}, p_{45}, p_{64}$ | $(t_7 + t_8 + 1) >> 1$ |
| — | $p_{17}, p_{36}$ | $p_{17}, p_{36}, p_{55}, p_{74}$ | $(t_7 + t_8 << 1 + t_9 + 2) >> 2$ |
| — | $p_{27}$ | $p_{27}, p_{46}, p_{65}$ | $(t_8 + t_9 + 1) >> 1$ |
| — | $p_{37}$ | $p_{37}, p_{56}, p_{75}$ | $(t_8 + t_9 << 1 + t_{10} + 2) >> 2$ |
| — | — | $p_{47}, p_{66}$ | $(t_9 + t_{10} + 1) >> 1$ |
| — | — | $p_{57}, p_{76}$ | $(t_9 + t_{10} << 1 + t_{11} + 2) >> 2$ |
| — | — | $p_{67}$ | $(t_{10} + t_{11} + 1) >> 1$ |
| — | — | $p_{77}$ | $(t_{10} + t_{11} << 1 + t_{12} + 2) >> 2$ |

Mode 7
Where all $t_0$-$t_N$ and $l_0$-$l_M$ are available for prediction

| 4 × 8 subblock | 8 × 4 subblock | 8 × 8 subblock | predicted by |
|---|---|---|---|
| $p_{00}$ | $p_{00}$ | $p_{00}$ | $(l_0 + l_1 + 1) >> 1$ |
| $p_{01}$ | $p_{01}$ | $p_{01}$ | $(l_0 + l_1 << 1 + l_2 + 2) >> 2$ |
| $p_{10}, p_{02}$ | $p_{10}, p_{02}$ | $p_{10}, p_{02}$ | $(l_1 + l_2 + 1) >> 1$ |
| $p_{11}, p_{03}$ | $p_{11}, p_{03}$ | $p_{11}, p_{03}$ | $(l_1 + l_2 << 1 + l_3 + 2) >> 2$ |
| $p_{20}, p_{12}$ | $p_{20}, p_{12}, p_{04}$ | $p_{20}, p_{12}, p_{04}$ | $(l_2 + l_3 + 1) >> 1$ |
| $p_{21}, p_{13}$ | $p_{21}, p_{13}, p_{05}$ | $p_{21}, p_{13}, p_{05}$ | $(l_2 + l_3 << 1 + l_4 + 2) >> 2$ |
| $p_{30}, p_{22}$ | $p_{30}, p_{22}, p_{14}, p_{06}$ | $p_{30}, p_{22}, p_{14}, p_{06}$ | $(l_3 + l_4 + 1) >> 1$ |
| $p_{31}, p_{23}$ | $p_{31}, p_{23}, p_{15}, p_{07}$ | $p_{31}, p_{23}, p_{15}, p_{07}$ | $(l_3 + l_4 << 1 + l_5 + 2) >> 2$ |
| $p_{40}, p_{32}$ | $p_{32}, p_{24}, p_{16}$ | $p_{40}, p_{32}, p_{24}, p_{16}$ | $(l_4 + l_5 + 1) >> 1$ |
| $p_{41}, p_{33}$ | $p_{33}, p_{25}, p_{17}$ | $p_{41}, p_{33}, p_{25}, p_{17}$ | $(l_4 + l_5 << 1 + l_6 + 2) >> 2$ |
| $p_{50}, p_{42}$ | $p_{34}, p_{26}$ | $p_{50}, p_{42}, p_{34}, p_{26}$ | $(l_5 + l_6 + 1) >> 1$ |
| $p_{51}, p_{43}$ | $p_{35}, p_{27}$ | $p_{51}, p_{43}, p_{35}, p_{27}$ | $(l_5 + l_6 << 1 + l_7 + 2) >> 2$ |
| $p_{60}, p_{52}$ | $p_{36}$ | $p_{60}, p_{52}, p_{44}, p_{36}$ | $(l_6 + l_7 + 1) >> 1$ |

-continued

| 4 × 8 subblock | 8 × 4 subblock | 8 × 8 subblock | predicted by |
|---|---|---|---|
| $p_{61}, p_{53}$ | $p_{37}$ | $p_{61}, p_{53}, p_{45}, p_{37}$ | $(l_6 + l_7 << 1 + l_7 + 2) >> 2$ |
| $p_{70}, p_{62}$, | — | $p_{70}, p_{71}, p_{72}, p_{73}$, | $l_7$ |
| $p_{71}, p_{63}$, | | $p_{74}, p_{75}, p_{76}, p_{77}$, | |
| $p_{72}, p_{73}$ | | $p_{62}, p_{63}, p_{64}, p_{65}$, | |
| | | $p_{66}, p_{67}, p_{54}, p_{55}$, | |
| | | $p_{56}, p_{57}, p_{46}, p_{47}$ | |

Mode 8

Where all $t_0$-$t_N$ and $l_0$-$l_M$ are available for prediction, then

| 4 × 8 subblock | 8 × 4 subblock | 8 × 8 subblock | predicted by |
|---|---|---|---|
| — | $p_{07}$ | $p_{07}$ | $(t_4 + t_5 << 1 + t_6 + 2) >> 2$ |
| — | $p_{06}$ | $p_{06}$ | $(t_3 + t_4 << 1 + t_5 + 2) >> 2$ |
| — | $p_{05}, p_{17}$ | $p_{05}, p_{17}$ | $(t_2 + t_3 << 1 + t_4 + 2) >> 2$ |
| — | $p_{04}, p_{16}$ | $p_{04}, p_{16}$ | $(t_1 + t_2 << 1 + t_3 + 2) >> 2$ |
| $p_{03}$ | $p_{03}, p_{15}, p_{27}$ | $p_{03}, p_{15}, p_{27}$ | $(t_0 + t_1 << 1 + t_2 + 2) >> 2$ |
| $p_{02}$ | $p_{02}, p_{14}, p_{26}$ | $p_{02}, p_{14}, p_{26}$ | $(q + t_0 << 1 + t_1 + 2) >> 2$ |
| $p_{01}, p_{13}$ | $p_{01}, p_{13}, p_{25}, p_{37}$ | $p_{01}, p_{13}, p_{25}, p_{37}$ | $(l_0 + q << 1 + t_0 + 2) >> 2$ |
| $p_{00}, p_{12}$ | $p_{00}, p_{12}, p_{24}, p_{36}$ | $p_{00}, p_{12}, p_{24}, p_{36}$ | $(q + l_0 + 1) >> 1$ |
| $p_{10}, p_{22}$ | $p_{10}, p_{22}, p_{34}$ | $p_{10}, p_{22}, p_{34}, p_{46}$ | $(l_0 + l_1 + 1) >> 1$ |
| $p_{11}, p_{23}$ | $p_{11}, p_{23}, p_{35}$ | $p_{11}, p_{23}, p_{35}, p_{47}$ | $(q + l_0 << 1 + l_1 + 2) >> 2$ |
| $p_{20}, p_{32}$ | $p_{20}, p_{32}$ | $p_{20}, p_{32}, p_{44}, p_{56}$ | $(l_1 + l_2 + 1) >> 1$ |
| $p_{21}, p_{33}$ | $p_{21}, p_{33}$ | $p_{21}, p_{33}, p_{45}, p_{57}$ | $(l_0 + l_1 << 1 + l_2 + 2) >> 2$ |
| $p_{30}, p_{42}$ | $p_{30}$ | $p_{30}, p_{42}, p_{54}, p_{65}$ | $(l_2 + l_3 + 1) >> 1$ |
| $p_{31}, p_{43}$ | $p_{31}$ | $p_{31}, p_{43}, p_{55}, p_{67}$ | $(l_1 + l_2 << 1 + l_3 + 2) >> 2$ |
| $p_{40}, p_{52}$ | — | $p_{40}, p_{52}, p_{64}, p_{76}$ | $(l_3 + l_4 + 1) >> 1$ |
| $p_{41}, p_{53}$ | — | $p_{41}, p_{53}, p_{65}, p_{77}$ | $(l_2 + l_3 << 1 + l_4 + 2) >> 2$ |
| $p_{50}, p_{62}$ | — | $p_{50}, p_{62}, p_{74}$ | $(l_4 + l_5 + 1) >> 1$ |
| $p_{51}, p_{63}$ | — | $p_{51}, p_{63}, p_{75}$ | $(l_3 + l_4 << 1 + l_5 + 2) >> 2$ |
| $p_{60}, p_{72}$ | — | $p_{60}, p_{72}$ | $(l_5 + l_6 + 1) >> 1$ |
| $p_{61}, p_{73}$ | — | $p_{61}, p_{73}$ | $(l_4 + l_5 << 1 + l_6 + 2) >> 2$ |
| $p_{70}$ | — | $p_{70}$ | $(l_6 + l_7 + 1) >> 1$ |
| $p_{71}$ | — | $p_{71}$ | $(l_5 + l_6 << 1 + l_7 + 2) >> 2$ |

CONCLUSION AND EPILOGUE

Thus, it can be seen from the above descriptions, a novel method for intracoding and decoding video frame data, including encoders, decoders, devices and systems incorporated with the method have been described.

While the present invention has been described in terms of the foregoing embodiments and example applications, those skilled in the art will recognize that the invention is not limited to the embodiments and example application described. The present invention can be practiced with modification and alteration within the spirit and scope of the appended claims. In particular, some or all of the present invention (e.g. the various operational logic) may be implemented in Application Specific Integrated Circuits (ASIC).

Thus, the description is to be regarded as illustrative instead of restrictive on the present invention.

What is claimed is:

1. An apparatus comprising:
a storage medium; and
a plurality of instructions stored in the storage medium, with the instructions designed to perform a selected one of (a) intracoding of a macroblock of video data and decoding of an intracoded macroblock of video data, where an intracoded macroblock includes a M×N subblock of pixel values predicted under a first prediction mode as follows:

where $t_0$-$t_N$ and $l_0$-$l_M$ are available, $P_{ij} = (t_0 + \ldots + t_N + l_0 + \ldots + l_M + N/2 + M/2)/(M+N);$ Else if only $t_0$-$t_N$ are available, $P_{ij} = (t_0 + \ldots + t_N + N/2)/N;$ Else if only $l_0$-$l_M$ are available, $P_{ij} = (l_0 + \ldots + l_M + M/2)/M;$ Else $P_{ij} = 128;$ for i=0–(N–1), j=0–(M–1);
where $P_{ij}$ are pixel values of the M×N subblock, with i and j being indices denoting row and columns positions within the M×N subblock;
$t_0$-$t_N$ are pixel values of adjacent subblocks above the M×N subblock; and
$l_0$-$l_m$ are pixel values of adjacent subblocks to the left of the M×N subblock.

2. The apparatus of claim 1, wherein the instructions are further designed to perform the selected one of intracoding of a macroblock and decoding of an intracoded macroblock where an intracoded macroblock includes a M×N subblock of pixel values predicted under a second prediction mode, where a column of pixel values is predicted as follows:
where $t_0$-$t_N$ are available, $P_{ij} = t_j$.

3. The apparatus of claim 1, wherein the instructions are further designed to perform the selected one of intracoding of a macroblock and decoding of an intracoded macroblock where an intracoded macroblock includes a M×N subblock of pixel values predicted under a second prediction mode, where a row of pixel values is predicted as follows
where $l_0$-$l_N$ are available, $P_{ij} = l_i$.

4. The apparatus of claim 1, wherein the instructions are further designed to perform the selected one of intracoding of a macroblock and decoding of an intracoded macroblock where an intracoded macroblock includes at least a selected one of a 4×8 subblock, a 8×4 subblock and a 8×8 subbblock of pixel values predicted under a second prediction mode, where a diagonal of pixel values is predicted in accordance with a selected of:

| 4 × 8 subblock | 8 × 4 subblock | 8 × 8 subblock | predicted by |
|---|---|---|---|
| — | $p_{07}$ | $p_{07}$ | $(t_5 + t_6 << 1 + t_7 + 2) >> 2$ |
| — | $p_{06}, p_{17}$ | $p_{06}, p_{17}$ | $(t_4 + t_5 << 1 + t_6 + 2) >> 2$ |
| — | $p_{05}, p_{16}, p_{27}$ | $p_{05}, p_{16}, p_{27}$ | $(t_3 + t_4 << 1 + t_5 + 2) >> 2$ |
| — | $p_{04}, p_{15}, p_{26}, p_{37}$ | $p_{04}, p_{15}, p_{26}, p_{37}$ | $(t_2 + t_3 << 1 + t_4 + 2) >> 2$ |
| $p_{03}$ | $p_{03}, p_{14}, p_{25}, p_{36}$ | $p_{03}, p_{14}, p_{25}, p_{36}, p_{47}$ | $(t_1 + t_2 << 1 + t_3 + 2) >> 2$ |
| $p_{02}, p_{13}$ | $p_{02}, p_{13}, p_{24}, p_{35}$ | $p_{02}, p_{13}, p_{24}, p_{35}, p_{46}, p_{57}$ | $(t_0 + t_1 << 1 + t_2 + 2) >> 2$ |

-continued

| 4 × 8 subblock | 8 × 4 subblock | 8 × 8 subblock | predicted by |
|---|---|---|---|
| $p_{01}, p_{12}, p_{23}$ | $p_{01}, p_{12}, p_{23}, p_{34}$ | $p_{01}, p_{12}, p_{23}, p_{34},$ $p_{45}, p_{56}, p_{67}$ | $(q + t_0 << 1 + t_1 + 2) >> 2$ |
| $p_{00}, p_{11}, p_{22}, p_{33}$ | $p_{00}, p_{11}, p_{22}, p_{33}$ | $p_{00}, p_{11}, p_{22}, p_{33},$ $p_{44}, p_{55}, p_{66}, p_{77}$ | $(l_0 + q << 1 + t_0 + 2) >> 2$ |
| $p_{10}, p_{21}, p_{32}, p_{43}$ | $p_{10}, p_{21}, p_{32}$ | $p_{10}, p_{21}, p_{32}, , p_{43},$ $p_{54}, p_{65}, p_{76}$ | $(l_1 + l_0 << 1 + q + 2) >> 2$ |
| $p_{20}, p_{31}, p_{42}, p_{53}$ | $p_{20}, p_{31}$ | $p_{20}, p_{31}, p_{42}, p_{53},$ $p_{64}, p_{75}$ | $(l_2 + l_1 << 1 + l_0 + 2) >> 2$ |
| $p_{30}, p_{41}, p_{52}, p_{63}$ | $p_{30}$ | $p_{30}, p_{41}, p_{52}, p_{63},$ $p_{74}$ | $(l_3 + l_2 << 1 + l_1 + 2) >> 2$ |
| $p_{40}, p_{51}, p_{62}, p_{73}$ | — | $p_{40}, p_{51}, p_{62}, p_{73}$ | $(l_4 + l_3 << 1 + l_2 + 2) >> 2$ |
| $p_{50}, p_{61}, p_{72}$ | — | $p_{50}, p_{61}, p_{72}$ | $(l_5 + l_4 << 1 + l_3 + 2) >> 2$ |
| $p_{60}, p_{71}$ | — | $p_{60}, p_{71}$ | $(l_6 + l_5 << 1 + l_4 + 2) >> 2$ |
| $p_{70}$ | — | $p_{70}$ | $(l_7 + l_6 << 1 + l_5 + 2) >> 2.$ |

5. The apparatus of claim 1, wherein the instructions are further designed to perform the selected one of intracoding of a macroblock and decoding of an intracoded macroblock where an intracoded macroblock includes at least a selected one of a 4×8 subblock, a 8×4 subblock and a 8×8 subbblock of pixel values predicted under a second prediction mode, where a diagonal of pixel values is predicted in accordance with a selected one of:

| 4 × 8 subblock | 8 × 4 subblock | 8 × 8 subblock | predicted by |
|---|---|---|---|
| $p_{00}$ | $p_{00}$ | $p_{00}$ | $(t_2 + t_1 << 1 + t_0 + 2) >> 2$ |
| $p_{01}, p_{10}$ | $p_{01}, p_{10}$ | $p_{01}, p_{10}$ | $(t_3 + t_2 << 1 + t_1 + 2) >> 2$ |
| $p_{02}, p_{11}, p_{20}$ | $p_{02}, p_{11}, p_{20}$ | $p_{02}, p_{11}, p_{20}$ | $(t_4 + t_3 << 1 + t_2 + 2) >> 2$ |
| $p_{03}, p_{12}, p_{21}, p_{30}$ | $p_{03}, p_{12}, p_{21}, p_{30}$ | $p_{03}, p_{12}, p_{21}, p_{30}$ | $(t_5 + t_4 << 1 + t_3 + 2) >> 2$ |
| $p_{13}, p_{22}, p_{31}, p_{40}$ | $p_{04}, p_{13}, p_{22}, p_{31}$ | $p_{04}, p_{13}, p_{22}, p_{31}, p_{40}$ | $(t_6 + t_5 << 1 + t_4 + 2) >> 2$ |
| $p_{23}, p_{32}, p_{41}, p_{50}$ | $p_{05}, p_{14}, p_{23}, p_{32}$ | $p_{05}, p_{14}, p_{23}, p_{32}, p_{41}, p_{50}$ | $(t_7 + t_6 << 1 + t_5 + 2) >> 2$ |
| $p_{33}, p_{42}, p_{51}, p_{60}$ | $p_{06}, p_{15}, p_{24}, p_{33}$ | $p_{06}, p_{15}, p_{24}, p_{33}, p_{42}, p_{51}, p_{60}$ | $(t_8 + t_7 << 1 + t_6 + 2) >> 2$ |
| $p_{43}, p_{52}, p_{61}, p_{70}$ | $p_{07}, p_{16}, p_{25}, p_{34}$ | $p_{07}, p_{16}, p_{25}, p_{34}, p_{43}, p_{52}, p_{61}, p_{70}$ | $(t_9 + t_8 << 1 + t_7 + 2) >> 2$ |
| $p_{53}, p_{62}, p_{71}$ | $p_{17}, p_{26}, p_{35}$ | $p_{17}, p_{26}, p_{35}, , p_{44}, p_{53}, p_{62}, p_{71}$ | $(t_{10} + t_9 << 1 + t_8 + 2) >> 2$ |
| $p_{63}, p_{72}$ | $p_{27}, p_{36}$ | $p_{27}, p_{36}, p_{45}, p_{54}, p_{63}, p_{72}$ | $(t_{11} + t_{10} << 1 + t_9 + 2) >> 2$ |
| $p_{73}$ | $p_{37}$ | $p_{37}, p_{46}, p_{55}, p_{64}, p_{73}$ | $(t_{12} + t_{11} << 1 + t_{10} + 2) >> 2$ |
| — | — | $p_{47}, p_{56}, p_{65}, p_{74}$ | $(t_{13} + t_{12} << 1 + t_{11} + 2) >> 2$ |
| — | — | $p_{57}, p_{66}, p_{75}$ | $(t_{14} + t_{13} << 1 + t_{12} + 2) >> 2$ |
| — | — | $p_{67}, p_{76}$ | $(t_{15} + t_{14} << 1 + t_{13} + 2) >> 2$ |
| — | — | $p_{77}$ | $(t_{15} + t_{15} << 1 + t_{14} + 2) >> 2.$ |

6. The apparatus of claim 1, wherein the instructions are further designed to perform the selected one of intracoding of a macroblock and decoding of an intracoded macroblock where an intracoded macroblock includes at least a selected one of a 4×8 subblock, a 8×4 subblock and a 8×8 subbblock of pixel values predicted under a second prediction mode, where a diagonal of pixel values is predicted in accordance with a selection one of:

| 4 × 8 subblock | 8 × 4 subblock | 8 × 8 subblock | predicted by |
|---|---|---|---|
| — | $p_{07}$ | $p_{07}$ | $(t_6 + t_7 + 1) >> 1$ |
| — | $p_{17}$ | $p_{17}$ | $(t_5 + t_6 << 1 + t_7 + 2) >> 2$ |
| — | $p_{06}, p_{27}$ | $p_{06}, p_{27}$ | $(t_5 + t_6 + 1) >> 1$ |
| — | $p_{16}, p_{37}$ | $p_{16}, p_{37}$ | $(t_4 + t_5 << 1 + t_6 + 2) >> 2$ |
| — | $p_{05}, p_{26}$ | $p_{05}, p_{26}, p_{47}$ | $(t_4 + t_5 + 1) >> 1$ |
| — | $p_{15}, p_{36}$ | $p_{15}, p_{36}, p_{57}$ | $(t_3 + t_4 << 1 + t_5 + 2) >> 2$ |
| — | $p_{04}, p_{25}$ | $p_{04}, p_{25}, p_{46}, p_{67}$ | $(t_3 + t_4 + 1) >> 1$ |
| — | $p_{14}, p_{35}$ | $p_{14}, p_{35}, p_{56}, p_{77}$ | $(t_2 + t_3 << 1 + t_4 + 2) >> 2$ |
| $p_{03}$ | $p_{03}, p_{24}$ | $p_{03}, p_{24}, p_{45}, p_{66}$ | $(t_2 + t_3 + 1) >> 1$ |
| $p_{13}$ | $p_{13}, p_{34}$ | $p_{13}, p_{34}, p_{55}, p_{76}$ | $(t_1 + t_2 << 1 + t_3 + 2) >> 2$ |
| $p_{02}, p_{23}$ | $p_{02}, p_{23}$ | $p_{02}, p_{23}, p_{44}, p_{65}$ | $(t_1 + t_2 + 1) >> 1$ |
| $p_{12}, p_{33}$ | $p_{12}, p_{33}$ | $p_{12}, p_{33}, p_{54}, p_{75}$ | $(t_0 + t_1 << 1 + t_2 + 2) >> 2$ |
| $p_{01}, p_{22}, p_{43}$ | $p_{01}, p_{22}$ | $p_{01}, p_{22}, p_{43}, p_{64}$ | $(t_0 + t_1 + 1) >> 1$ |
| $p_{11}, p_{32}, p_{53}$ | $p_{11}, p_{32}$ | $p_{11}, p_{32}, p_{53}, p_{74}$ | $(q + t_0 << 1 + t_1 + 2) >> 2$ |
| $p_{00}, p_{21}, p_{42}, p_{63}$ | $p_{00}, p_{21}$ | $p_{00}, p_{21}, p_{42}, p_{63}$ | $(q + t_0 + 1) >> 1$ |
| $p_{10}, p_{31}, p_{52}, p_{73}$ | $p_{10}, p_{31}$ | $p_{10}, p_{31}, p_{52}, p_{73}$ | $(l_0 + q << 1 + t_0 + 2) >> 2$ |

-continued

| 4 × 8 subblock | 8 × 4 subblock | 8 × 8 subblock | predicted by |
|---|---|---|---|
| $p_{20}, p_{41}, p_{62}$ | $p_{20}$ | $p_{20}, p_{41}, p_{62}$ | $(l_1 + l_0 << 1 + q + 2) >> 2$ |
| $p_{30}, p_{51}, p_{72}$ | $p_{30}$ | $p_{30}, p_{51}, p_{72}$ | $(l_2 + l_1 << 1 + l_0 + 2) >> 2$ |
| $p_{40}, p_{61}$ | — | $p_{40}, p_{61}$ | $(l_3 + l_2 << 1 + l_1 + 2) >> 2$ |
| $p_{50}, p_{71}$ | — | $p_{50}, p_{71}$ | $(l_4 + l_3 << 1 + l_2 + 2) >> 2$ |
| $p_{60}$ | — | $p_{60}$ | $(l_5 + l_4 << 1 + l_3 + 2) >> 2$ |
| $p_{70}$ | — | $p_{70}$ | $(l_6 + l_5 << 1 + l_4 + 2) >> 2$. |

7. The apparatus of claim 1, wherein the instructions are further designed to intracoded macroblock where an intracoded macroblock includes at least a selected one of a 4×8 subblock, a 8×4 subblock and a 8×8 subbblock of pixel values predicted under a second prediction mode, where a diagonal of pixel values is predicted in accordance with a selected one of:

| 4 × 8 subblock | 8 × 4 subblock | 8 × 8 subblock | predicted by |
|---|---|---|---|
| $p_{00}$ | $p_{00}$ | $p_{00}$ | $(t_0 + t_1 + 1) >> 1$ |
| $p_{10}$ | $p_{10}$ | $p_{10}$ | $(t_0 + t_1 << 1 + t_2 + 2) >> 2$ |
| $p_{01}, p_{20}$ | $p_{01}, p_{20}$ | $p_{01}, p_{20}$ | $(t_1 + t_2 + 1) >> 1$ |
| $p_{11}, p_{30}$ | $p_{11}, p_{30}$ | $p_{11}, p_{30}$ | $(t_1 + t_2 << 1 + t_3 + 2) >> 2$ |
| $p_{02}, p_{21}, p_{40}$ | $p_{02}, p_{21}$ | $p_{02}, p_{21}, p_{40}$ | $(t_2 + t_3 + 1) >> 1$ |
| $p_{12}, p_{31}, p_{50}$ | $p_{12}, p_{31}$ | $p_{12}, p_{31}, p_{50}$ | $(t_2 + t_3 << 1 + t_4 + 2) >> 2$ |
| $p_{03}, p_{22}, p_{41}, p_{60}$ | $p_{03}, p_{22}$ | $p_{03}, p_{22}, p_{41}, p_{60}$ | $(t_3 + t_4 + 1) >> 1$ |
| $p_{13}, p_{32}, p_{51}, p_{70}$ | $p_{13}, p_{32}$ | $p_{13}, p_{32}, p_{51}, p_{70}$ | $(t_3 + t_4 << 1 + t_5 + 2) >> 2$ |
| $p_{23}, p_{42}, p_{61}$ | $p_{04}, p_{23}$ | $p_{04}, p_{23}, p_{42}, p_{61}$ | $(t_4 + t_5 + 1) >> 1$ |
| $p_{33}, p_{52}, p_{71}$ | $p_{14}, p_{33}$ | $p_{14}, p_{33}, p_{52}, p_{71}$ | $(t_4 + t_5 << 1 + t_6 + 2) >> 2$ |
| $p_{43}, p_{62}$ | $p_{05}, p_{24}$ | $p_{05}, p_{24}, p_{43}, p_{62}$ | $(t_5 + t_6 + 1) >> 1$ |
| $p_{53}, p_{72}$ | $p_{15}, p_{34}$ | $p_{15}, p_{34}, p_{53}, p_{72}$ | $(t_5 + t_6 << 1 + t_7 + 2) >> 2$ |
| $p_{63}$ | $p_{06}, p_{25}$ | $p_{06}, p_{25}, p_{44}, p_{63}$ | $(t_6 + t_7 + 1) >> 1$ |
| $p_{73}$ | $p_{16}, p_{35}$ | $p_{16}, p_{35}, p_{54}, p_{73}$ | $(t_6 + t_7 << 1 + t_8 + 2) >> 2$ |
| — | $p_{07}, p_{26}$ | $p_{07}, p_{26}, p_{45}, p_{64}$ | $(t_7 + t_8 + 1) >> 1$ |
| — | $p_{17}, p_{36}$ | $p_{17}, p_{36}, p_{55}, p_{74}$ | $(t_7 + t_8 << 1 + t_9 + 2) >> 2$ |
| — | $p_{27}$ | $p_{27}, p_{46}, p_{65}$ | $(t_8 + t_9 + 1) >> 1$ |
| — | $p_{37}$ | $p_{37}, p_{56}, p_{75}$ | $(t_8 + t_9 << 1 + t_{10} + 2) >> 2$ |
| — | — | $p_{47}, p_{66}$ | $(t_9 + t_{10} + 1) >> 1$ |
| — | — | $p_{57}, p_{76}$ | $(t_9 + t_{10} << 1 + t_{11} + 2) >> 2$ |
| — | — | $p_{67}$ | $(t_{10} + t_{11} + 1) >> 1$ |
| — | — | $p_{77}$ | $(t_{10} + t_{11} << 1 + t_{12} + 2) >> 2$. |

8. The apparatus of claim 1, wherein the instructions are further designed to perform the selected one of intracoding of a macroblock and decoding of an intracoded macroblock where an intracoded macroblock includes at least a selected one of a 4×8 subblock, a 8×4 subblock and a 8×8 subbblock of pixel values predicted under a second prediction mode, where a diagonal of pixel values is predicted in accordance with a selected one of:

| 4 × 8 subblock | 8 × 4 subblock | 8 × 8 subblock | predicted by |
|---|---|---|---|
| $p_{00}$ | $p_{00}$ | $p_{00}$ | $(l_0 + l_1 + 1) >> 1$ |
| $p_{01}$ | $p_{01}$ | $p_{01}$ | $(l_0 + l_1 << 1 + l_2 + 2) >> 2$ |
| $p_{10}, p_{02}$ | $p_{10}, p_{02}$ | $p_{10}, p_{02}$ | $(l_1 + l_2 + 1) >> 1$ |
| $p_{11}, p_{03}$ | $p_{11}, p_{03}$ | $p_{11}, p_{03}$ | $(l_1 + l_2 << 1 + l_3 + 2) >> 2$ |
| $p_{20}, p_{12}$ | $p_{20}, p_{12}, p_{04}$ | $p_{20}, p_{12}, p_{04}$ | $(l_2 + l_3 + 1) >> 1$ |
| $p_{21}, p_{13}$ | $p_{21}, p_{13}, p_{05}$ | $p_{21}, p_{13}, p_{05}$ | $(l_2 + l_3 << 1 + l_4 + 2) >> 2$ |
| $p_{30}, p_{22}$ | $p_{30}, p_{22}, p_{14}, p_{06}$ | $p_{30}, p_{22}, p_{14}, p_{06}$ | $(l_3 + l_4 + 1) >> 1$ |
| $p_{31}, p_{23}$ | $p_{31}, p_{23}, p_{15}, p_{07}$ | $p_{31}, p_{23}, p_{15}, p_{07}$ | $(l_3 + l_4 << 1 + l_5 + 2) >> 2$ |
| $p_{40}, p_{32}$ | $p_{32}, p_{24}, p_{16}$ | $p_{40}, p_{32}, p_{24}, p_{16}$ | $(l_4 + l_5 + 1) >> 1$ |
| $p_{41}, p_{33}$ | $p_{33}, p_{25}, p_{17}$ | $p_{41}, p_{33}, p_{25}, p_{17}$ | $(l_4 + l_5 << 1 + l_6 + 2) >> 2$ |
| $p_{50}, p_{42}$ | $p_{34}, p_{26}$ | $p_{50}, p_{42}, p_{34}, p_{26}$ | $(l_5 + l_6 + 1) >> 1$ |
| $p_{51}, p_{43}$ | $p_{35}, p_{27}$ | $p_{51}, p_{43}, p_{35}, p_{27}$ | $(l_5 + l_6 << 1 + l_7 + 2) >> 2$ |
| $p_{60}, p_{52}$ | $p_{36}$ | $p_{60}, p_{52}, p_{44}, p_{36}$ | $(l_6 + l_7 + 1) >> 1$ |
| $p_{61}, p_{53}$ | $p_{37}$ | $p_{61}, p_{53}, p_{45}, p_{37}$ | $(l_6 + l_7 << 1 + l_7 + 2) >> 2$ |
| $p_{70}, p_{62}, p_{71}, p_{63}, p_{72}, p_{73}$ | — | $p_{70}, p_{71}, p_{72}, p_{73}, p_{74}, p_{75}, p_{76}, p_{77}, p_{62}, p_{63}, p_{64}, p_{65}, p_{66}, p_{67}, p_{54}, p_{55}, p_{56}, p_{57}, p_{46}, p_{47}.$ | $l_7.$ |

9. The apparatus of claim 1, wherein the instructions are further designed to perform the selected one of intracoding of a macroblock and decoding of an intracoded macroblock where an intracoded macroblock includes at least a selected one of a 4×8 subblock, a 8×4 subblock and a 8×8 subbblock of pixel values predicted under a second prediction mode, where a diagonal of pixel values is predicted in accordance with a selected one of:

| 4 × 8 subblock | 8 × 4 subblock | 8 × 8 subblock | predicted by |
|---|---|---|---|
| — | $p_{07}$ | $p_{07}$ | $(t_4 + t_5 << 1 + t_6 + 2) >> 2$ |
| — | $p_{06}$ | $p_{06}$ | $(t_3 + t_4 << 1 + t_5 + 2) >> 2$ |
| — | $p_{05}, p_{17}$ | $p_{05}, p_{17}$ | $(t_2 + t_3 << 1 + t_4 + 2) >> 2$ |
| — | $p_{04}, p_{16}$ | $p_{04}, p_{16}$ | $(t_1 + t_2 << 1 + t_3 + 2) >> 2$ |
| $p_{03}$ | $p_{03}, p_{15}, p_{27}$ | $p_{03}, p_{15}, p_{27}$ | $(t_0 + t_1 << 1 + t_2 + 2) >> 2$ |
| $p_{02}$ | $p_{02}, p_{14}, p_{26}$ | $p_{02}, p_{14}, p_{26}$ | $(q + t_0 << 1 + t_1 + 2) >> 2$ |
| $p_{01}, p_{13}$ | $p_{01}, p_{13}, p_{25}, p_{37}$ | $p_{01}, p_{13}, p_{25}, p_{37}$ | $(l_0 + q << 1 + t_0 + 2) >> 2$ |
| $p_{00}, p_{12}$ | $p_{00}, p_{12}, p_{24}, p_{36}$ | $p_{00}, p_{12}, p_{24}, p_{36}$ | $(q + l_0 + 1) >> 1$ |
| $p_{10}, p_{22}$ | $p_{10}, p_{22}, p_{34}$ | $p_{10}, p_{22}, p_{34}, p_{46}$ | $(l_0 + l_1 + 1) >> 1$ |
| $p_{11}, p_{23}$ | $p_{11}, p_{23}, p_{35}$ | $p_{11}, p_{23}, p_{35}, p_{47}$ | $(q + l_0 << 1 + l_1 + 2) >> 2$ |
| $p_{20}, p_{32}$ | $p_{20}, p_{32}$ | $p_{20}, p_{32}, p_{44}, p_{56}$ | $(l_1 + l_2 + 1) >> 1$ |
| $p_{21}, p_{33}$ | $p_{21}, p_{33}$ | $p_{21}, p_{33}, p_{45}, p_{57}$ | $(l_0 + l_1 << 1 + l_2 + 2) >> 2$ |
| $p_{30}, p_{42}$ | $p_{30}$ | $p_{30}, p_{42}, p_{54}, p_{66}$ | $(l_2 + l_3 + 1) >> 1$ |
| $p_{31}, p_{43}$ | $p_{31}$ | $p_{31}, p_{43}, p_{55}, p_{67}$ | $(l_1 + l_2 << 1 + l_3 + 2) >> 2$ |
| $p_{40}, p_{52}$ | — | $p_{40}, p_{52}, p_{64}, p_{76}$ | $(l_3 + l_4 + 1) >> 1$ |
| $p_{41}, p_{53}$ | — | $p_{41}, p_{53}, p_{65}, p_{77}$ | $(l_2 + l_3 << 1 + l_4 + 2) >> 2$ |
| $p_{50}, p_{62}$ | — | $p_{50}, p_{62}, p_{74}$ | $(l_4 + l_5 + 1) >> 1$ |
| $p_{51}, p_{63}$ | — | $p_{51}, p_{63}, p_{75}$ | $(l_3 + l_4 << 1 + l_5 + 2) >> 2$ |
| $p_{60}, p_{72}$ | — | $p_{60}$ | $(l_5 + l_6 + 1) >> 1$ |
| $p_{61}, p_{73}$ | — | $p_{61}, p_{73}$ | $(l_4 + l_5 << 1 + l_6 + 2) >> 2$ |
| $p_{70}$ | — | $p_{70}$ | $(l_6 + l_7 + 1) >> 1$ |
| $p_{71}$ | — | $p_{71}$ | $(l_5 + l_6 << 1 + l_7 + 2) >> 2$. |

10. The apparatus of claim 1, wherein the apparatus further comprises a processor coupled to the storage medium to execute the instructions.

11. The apparatus of claim 1, wherein the apparatus comprises at least a selected one of an encoder and a decoder comprising the storage medium and the instructions.

12. The apparatus of claim 11, wherein the apparatus comprises a selected one of a palm sized computing device, a wireless mobile phone, a digital personal assistant, a laptop computing device, a desktop computing device, a set-top box, a server, a compact disk player, a digital versatile disk player, a television, and a display monitor.

13. The apparatus of claim 11, wherein the apparatus comprises a video daughter card and a motherboard having integrated video capability.

14. An apparatus comprising:
a storage medium to store at least a macroblock of video data; and
logic coupled to the storage medium to perform a selected one of intracoding of a macroblock of video data and decoding of an intracoded macroblock of video data, where an intracoded macroblock includes a M×N subblock of pixel values predicted under a first prediction mode as follows:

where $t_0$-$t_N$ and $l_0$-$l_M$ are available, $$P_{ij}=(t_0+\ldots+t_N+l_0+\ldots+l_M+N/2+M/2)/(M+N);$$

Else if only $t_0$-$t_N$ are available, $$P_{ij}=(t_0+\ldots+t_N+N/2)/N;$$

Else if only $l_0$-$l_M$ are available, $$P_{ij}=(l_0+\ldots+l_M+M/2)/M;$$

Else $$P_{ij}=128;$$

for i=0−(N−1), j=0−(M−1);

where $P_{ij}$ are pixel values of the M×N subblock, with i and j being indices denoting row and columns positions within the M×N subblock;

$t_0$-$t_N$ are pixel values of adjacent subblocks above the M×N subblock; and $l_0$-$l_m$ are pixel values of adjacent subblocks to the left of the M×N subblock.

* * * * *

UNITED STATES PATENT AND TRADEMARK OFFICE
CERTIFICATE OF CORRECTION

PATENT NO. : 7,606,312 B2
APPLICATION NO. : 10/525164
DATED : October 20, 2009
INVENTOR(S) : Gregory J. Conklin It is certified that error appears in the above-identified patent and that said Letters Patent is hereby corrected as shown below:

Column 1, line 49, "stream, namely intracoding and interceding." should read --stream, namely intracoding and intercoding-- as written in the original Application Data Sheet submitted February 22, 2005.

Column 6, line 43, "This applies also the other modes." should be changed to --This also applies to the other modes.--.

Column 16, lines 9 through 16, "Where $t_0$-$t_N$ and $l_0$-$l_M$ are available, $P_{ij} = (t_0 + \ldots t_N + l_0 + \ldots + l_M + N/2 + M/2)/(M+N)$; Else if only $t_0$-$t_N$ are available, $P_{ij} = (t_0 + \ldots + t_N + N/2)/N$; Else if only $l_0$-$l_M$ are available, $P_{ij} = l_0 + \ldots + l_M + M/2)/M$;" should be changed to --Where $t_0$-$t_{N-1}$ and $l_0$-$l_{M-1}$ are available, $P_{ij} = (t_0 + \ldots + t_{N-1} + l_0 + \ldots + l_{M-1} + N/2 + M/2)/(M+N)$; Else if only $t_0$-$t_{N-1}$ are available, $P_{ij} = (t_0 + \ldots + t_{N-1} + N/2)/N$; Else if only $l_0$-$l_{M-1}$ are available, $P_{ij} = l_0 + \ldots + l_{M-1} + M/2)/M$;--.

Column 16, line 24, "Where $t_0$-$t_N$ are available" should be changed to --Where $t_0$-$t_{N-1}$ are available--.

Column 16, line 29, "Where l0-lN are available" should be changed to --Where $l_0$-$l_{N-1}$ are available.--.

Column 16, line 37, "Where all $t_0$-$t_N$ and $l_0$-$l_M$ are available for prediction" should be changed to --Where all $t_0$-$t_{N-1}$ and $l_0$-$l_{M-1}$ are available for prediction--.

Column 17, lines 2, 26, and 55, "Where all $t_0$-$t_N$ and $l_0$-$l_N$ are available for prediction,..." should be changed to --Where all $t_0$-$t_{N-1}$ and $l_0$-$l_{M-1}$ are available for prediction,...--.

Signed and Sealed this
Twenty-seventh Day of September, 2011

David J. Kappos
*Director of the United States Patent and Trademark Office*

CERTIFICATE OF CORRECTION (continued)
U.S. Pat. No. 7,606,312 B2

Column 18, line 49, "Where all t(sub 0)-t(sub N) and l(sub 0)-l(sub M) are available for prediction,..." should be changed to --Where all t(sub 0)-t(sub N-1) and l(sub 0)-l(sub M-1) are available for prediction,...--.

Column 19, line 14, "Where all t(sub 0)-t(sub N) and l(sub 0)-l(sub M) are available for prediction,..." should be changed to --Where all t(sub 0)-t(sub N-1) and l(sub 0)-l(sub M-1) are available for prediction,...--.

Column 20, lines 9 through 10, "of (a) intracoding of a macroblock of video data and decoding of an intracoded..." should be changed to --of (a) intracoding of a macroblock of video data and (b) decoding of an intracoded... --.

Column 20, lines 14 through 21, "Where t(sub 0)-t(sub N) and l(sub 0)-l(sub M) are available, P(sub ij) =(t(sub 0) +... t(sub N)+ l(sub 0)+...+ l(sub M)+N/2+M/2)/(M+N); Else if only t(sub 0)-t(sub N) are available, P(sub ij) =(t (sub 0)+... +t(sub N)+N/2)/N; Else if only l(sub 0)- l(sub M) are available, P(sub ij) = l(sub 0)+...+ l(sub M) +M/2)/M;" should be changed to --Where t(sub 0)-t(sub N-1) and l(sub 0)-l(sub M-1) are available, P(sub ij) =(t (sub 0)+... +t(sub N-1)+ l(sub 0)+...+ l(sub M-1)+N/2+M/2)/(M+N); Else if only t(sub 0)-t(sub N-1) are available, P(sub ij) =(t(sub 0)+... +t(sub N-1)+N/2)/N; Else if only l(sub 0)- l(sub M-1) are available, P(sub ij) = l(sub 0)+...+ l(sub M-1)+M/2)/M;--.

Column 20, lines 29 through 31, "t(sub 0)-t(sub N) are pixel values of adjacent subblocks above the MxN subblock; and l(sub 0)-l(sub M) are pixel values of adjacent subblocks..." should be changed to --t(sub 0)-t(sub N-1) are pixel values of adjacent subblocks above the M×N subblock; and l(sub 0)-l(sub M-1) are pixel values of adjacent subblocks.--.

Column 20, line 39, "where t(sub 0)-t(sub N) are available, P(sub ij)=t(sub j)." should be changed to --where t(sub 0)-t(sub N-1) are available, P(sub ij)=t(sub j).--.

Column 20, line 47, "where l(sub 0)-l(sub N) are available, P(sub ij)=l(sub j)." should be changed to --where l(sub 0)-l(sub N-1) are available, P(sub ij)=l(sub j).--.

Column 23, line 14 "further designed to intracoded macroblock where an intracoded..." should be changed to --further designed to perform the selected one of intracoding of a macroblock and decoding of an intracoded macroblock where an intracoded...--.

Column 26, lines 1 through 10, "where t(sub 0)-t(sub N) and l(sub 0)-l(sub M) are available, P(sub ij) =(t(sub 0)+ ... t(sub N)+ l(sub 0)+...+ l(sub M)+N/2+M/2)/(M+N); Else if only t(sub 0)-t(sub N) are available, P(sub ij) =(t(sub 0)+... +t(sub N)+N/2)/N; Else if only l(sub 0)-l(sub M) are available, P(sub ij) = l(sub 0)+...+ l(sub M)+M/2)/M;" should be changed to --where t(sub 0)-t(sub N-1) and l(sub 0)-l(sub M-1) are available, P(sub ij) =(t(sub 0)+... +t (sub N-1)+ l(sub 0)+...+ l(sub M-1)+N/2+M/2)/(M+N); Else if only t(sub 0)-t(sub N-1) are available, P(sub ij) =(t (sub 0)+... +t(sub N-1)+N/2)/N; Else if only l(sub 0)- l(sub M-1) are available, P(sub ij) = l(sub 0)+...+ l(sub M-1) +M/2)/M;--.